(12) United States Patent
Parker, III et al.

(10) Patent No.: US 6,715,514 B2
(45) Date of Patent: Apr. 6, 2004

(54) METHOD AND APPARATUS FOR FLUID TRANSPORT, STORAGE AND DISPENSING

(75) Inventors: Frank L. Parker, III, Rye, NY (US); Walter D. Klatch, Mevaseret Zion (IL)

(73) Assignee: Worldwide Liquids, Yonkers, NY (US)

( * ) Notice: Subject to any disclaimer, the term of this patent is extended or adjusted under 35 U.S.C. 154(b) by 0 days.

(21) Appl. No.: 10/237,264

(22) Filed: Sep. 7, 2002

(65) Prior Publication Data

US 2004/0045623 A1 Mar. 11, 2004

(51) Int. Cl.[7] .................................................. B65B 1/04
(52) U.S. Cl. ................. 141/1; 141/9; 141/104; 141/231; 141/198
(58) Field of Search ................. 141/98, 83, 1, 141/2, 18, 100–105, 9, 198, 95, 231

(56) References Cited

U.S. PATENT DOCUMENTS

| | | |
|---|---|---|
| 1,325,094 A | 12/1919 | Hieber |
| 1,825,645 A | 9/1931 | Martin, Jr. |
| 1,897,939 A | 2/1933 | Martin |
| 2,017,235 A | 10/1935 | Drew |
| 2,047,935 A | 7/1936 | Beal et al. |
| 2,050,461 A | 8/1936 | Perry |
| 2,092,174 A | 9/1937 | Lithgow |
| 2,114,009 A | 4/1938 | Ramsay |
| 2,139,408 A | 12/1938 | Heuser |
| 2,203,229 A | 6/1940 | Nilsson et al. |
| 2,294,172 A | 8/1942 | Getz |
| 2,342,221 A | 2/1944 | Quinn |
| 2,649,124 A | 8/1953 | Merron |
| 3,071,469 A | 1/1963 | Krabbe et al. |
| 3,233,396 A | 2/1966 | Gallo |
| 3,403,826 A | 10/1968 | Buford et al. |
| 3,460,589 A | 8/1969 | Justis |
| 3,516,452 A | 6/1970 | Scholle |
| 3,832,474 A | 8/1974 | Karr |
| 3,837,137 A | 9/1974 | Yatsushiro et al. |
| 4,363,338 A | 12/1982 | Brown |
| 4,484,688 A | 11/1984 | Smith |
| 4,597,422 A | 7/1986 | Kovacevich, Jr. |
| 4,671,329 A | 6/1987 | Kovacevich, Jr. |
| 4,804,024 A | 2/1989 | Arnemann |
| 4,813,565 A | 3/1989 | Croser |
| 4,856,680 A | 8/1989 | Sitton |
| 4,887,651 A | 12/1989 | Santiago |
| 4,998,643 A | 3/1991 | Pradel |
| 5,092,488 A | 3/1992 | Pradel |
| 5,154,314 A | 10/1992 | Van Wormer |
| 5,234,035 A * | 8/1993 | Neeser ........................ 141/1 |
| 5,255,819 A | 10/1993 | Peckels |
| 5,392,827 A | 2/1995 | Yasso et al. |
| 5,537,913 A | 7/1996 | Vowles |
| 5,673,817 A | 10/1997 | Mullen et al. |
| 5,765,605 A * | 6/1998 | Waymire et al. ............ 141/100 |
| 5,806,573 A | 9/1998 | Kilcoin |
| 5,992,474 A | 11/1999 | Miller |
| 6,041,802 A | 3/2000 | Nelson |
| 6,059,146 A | 5/2000 | Meisner et al. |
| 6,227,262 B1 * | 5/2001 | Kohl et al. .................... 141/2 |
| 6,439,272 B1 * | 8/2002 | Wertheim ....................... 141/2 |

* cited by examiner

Primary Examiner—Steven O. Douglas
(74) Attorney, Agent, or Firm—Ward & Olivo

(57) ABSTRACT

A highly efficient apparatus and method for managing the transport, delivery, holding, dispensing, and removal of fluid material from a source to a user is disclosed. Material from the source in bulk form is transported to a customer in the quantity that is transmitted automatically from monitors or indicated manually. At the customer site, material is transferred directly via pipes and couplers, held and monitored at the user site in mini-tanks, and dispensed according to user needs. Data such as material volume in holding and other operational and monitoring data are gathered and transmitted automatically to a central processing center, where re-ordering and delivery planning are performed. These data are also utilized for analysis and business/operational planning.

20 Claims, 18 Drawing Sheets

METHOD AND APPARATUS FOR FLUID TRANSPORT, STORAGE AND DISPENSING

TECHNICAL FIELD OF THE INVENTION

The present invention is directed generally to the field of fluids management and distribution. More particularly, this invention relates to a highly efficient method and apparatus for the control of fluids, and especially liquids, distribution.

BACKGROUND OF THE INVENTION

Fluid distribution, as currently practiced in the art, clings to a standardized, though inefficient, methodology. Practitioners fail to take advantage of the fluid nature of liquids and gasses, and thus lose efficiency through a distribution and dispensing process that is poorly mated to their product. Currently, the distribution of liquid from a producer to end users typically involves transferring the liquid into individual containers, such as bottles, jugs, drums, etc. that are handled manually using cumbersome and expensive methods. The transfer of the liquid product into the individual containers also adds unnecessary costs to the distribution since the user typically discards the container after removing the liquid from it.

Liquid distribution, as practiced in the art, adds massive unnecessary costs to the liquid product, including the cost of transport, distribution, and the recycling of the unnecessary intermediary containers. In addition to the costs and the environmental impact of the containers and their disposal, all of the traditional distribution costs (labor/handling, facilities, equipment, theft, damage, etc.) become part of the product's final cost.

The transport and delivery of liquid products in individual intermediate containers has a number of other disadvantages. To deliver the liquid filled containers, one must enter the premises and manually deposit them. This requirement contributes a substantial portion of time and labor for delivery, and in many cases, severely restricts the times of day during which the delivery can be made to those in which the owner or operator of the facility is available to allow access.

FIG. 1A depicts a typical prior art method for distributing liquids. The product starts in bulk form at the producer 102, and is packaged into individual containers such as jugs, bottles, drums, etc. 103. The individual containers are typically packaged into boxes, the boxes are transferred into cartons, and assembled onto pallets for transportation 104. The supplier must then warehouse the pallets and perform manual order picking, counting, and recording of the material 105. The supplier takes orders 106 from wholesalers, and transports the goods 107 to the wholesaler 108. The wholesaler must have facilities for receiving, warehousing and distributing the packaged goods. The wholesaler receives customer orders and ships the products 109 requested to each customer. Normally, the customer must be present to receive the goods, as entry into the premises is required to handle and store 110 the goods. Once at the customer's location, the fluid product typically must be unpacked before its use 111. Conventionally, the customer must maintain a purchasing department to monitor the inventory, and place orders for more goods when appropriate. Furthermore, the customer must have a sufficient infrastructure and related overhead to accommodate and pay for the recycling 112 or disposal of the containers and associated packaging in which the liquid goods arrived.

Systems exist, such as for the distribution of various grades of gasoline to gas stations, in which certain liquids are delivered in bulk from a supplier to a customer location for being dispensed to an end user. Such prior art systems do not, however, permit the supplier to effectively and automatically control the supply chain, both for more effectively matching its own production or acquisition of the liquids to the market demand, and for ensuring the maintenance of adequate supplies of the various liquids at the customer site. Such existing systems further do not permit the supplier to ensure that the liquids dispensed to the end user still meet the supplier's quality standards when dispensed.

It is clear that there exists a need for a highly efficient method of distributing fluids in bulk form that monitors and controls the dispensing and quality of the fluid while at the customer's site.

SUMMARY OF THE INVENTION

In accordance with the invention there is provided a method and system for efficiently maintaining an adequate supply of a plurality of different fluids at customer sites by controlling the periodic delivery of needed amounts of such fluids to such sites from a bulk supplier of such fluids, in which the supplier maintains bulk supplies of such fluids and periodically, i.e., from time to time, delivers needed amounts of such fluids from its bulk supplies to mini-bulk tanks at the customer sites using a vehicle including a separate bulk tank for each of the fluids. The customer sites each include a separate container, in the form of a mini-bulk tank for each of the fluids being delivered. The customer site has a sensor system for monitoring information concerning the fluid in the mini-bulk tanks, such as the amount of fluid in each of the containers. This monitoring of the fluids in the mini-bulk tanks can be done by, e.g., sensing the fluid level or pressure in the container or by sensing the amount of fluid dispensed from the container. The sensor system associated with a container can be located, e.g., at the container or at a dispensing point. The fluids are dispensed from the mini-bulk tanks to end-users. The fluids may be dispensed for consumption, e.g., a beverage, or for use, e.g., dispensing fluids to an end user's car or for use in an industrial process. The monitored information concerning the level of fluid in each of the mini-bulk tanks is automatically transmitted to the supplier, which uses such information to determine the amount of each fluid to be delivered to each customer site during the next periodic delivery.

Advantageously, the vehicle delivering the fluids from to the customer can use a multi-conduit hose that has separate flow channels for each bulk tank on the vehicle and is terminated in a multi channel connector that mates with a multi-channel receptacle on the exterior of each customer's site. The multi-channel receptacle is connected by separate flow channels to the customer's mini-bulk tanks for allowing the efficient, simultaneous delivery of the separate fluids to the appropriate containers.

In accordance with another aspect of the invention, the sensing system at the customer's site can monitor other information concerning conditions at the customer site, such as the temperature, humidity, fluid characteristics, etc. for display to the customer and/or for transmission to the supplier.

The method and system of the invention is appropriate for use with a wide variety of liquids, gases, powders, pellets and other particulate solids that will flow through the delivery lines from the vehicle to the mini-bulk tanks at the customer site. These materials may also be propelled by a variety of known propellants.

In accordance with still another aspect of the invention, all elements of the distribution system can duplicate the supplier's optimal storage conditions for the fluids in order to prevent any contamination or deterioration thereof before they are dispensed to the end user. For instance, the temperature, atmosphere and humidity to which the fluids are exposed at all stages of the method of the invention from supplier to end user can be controlled to be at optimal conditions.

SUMMARY OF THE DRAWINGS

The present invention can best be understood from the following description of certain preferred embodiments that are illustrated in the accompanying drawings.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative.

Generally, the disclosed embodiment of the present invention is comprised of several elements, including (1) mechanical and physical elements, (2) processes and procedures, and (3) computer and information elements. Mechanical and physical elements include transport and holding equipment appropriate for various materials, tubes appropriate for various materials, trucks appropriate for the transport of various materials, communication equipment, etc., as well as the configuration of these physical elements to allow mass customization. Process and procedures include steps such as the configuration and loading of delivery trucks according to delivery requirements, non-intrusive delivery through an external port, etc. Computer and information elements include data collection at the user site, transmission of data to the home site, PLC (programmable logic controller) processing, etc. These elements coalesce into a business flow, a physical/planning flow, a material re-order flow, and an information flow.

Figure 1A:
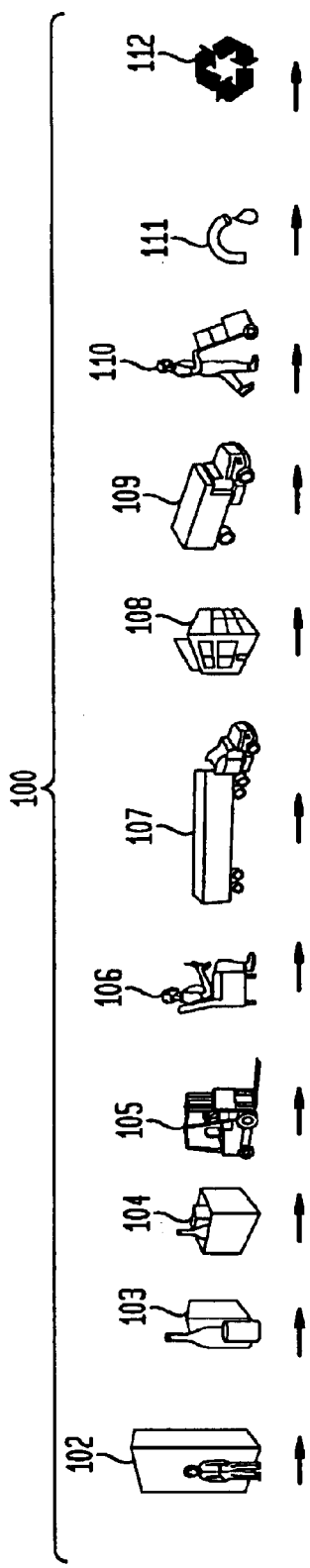
FIG. 1A (PRIOR ART) illustrates the supply chain commonly employed in the fluid distribution art.
Figure 1B:
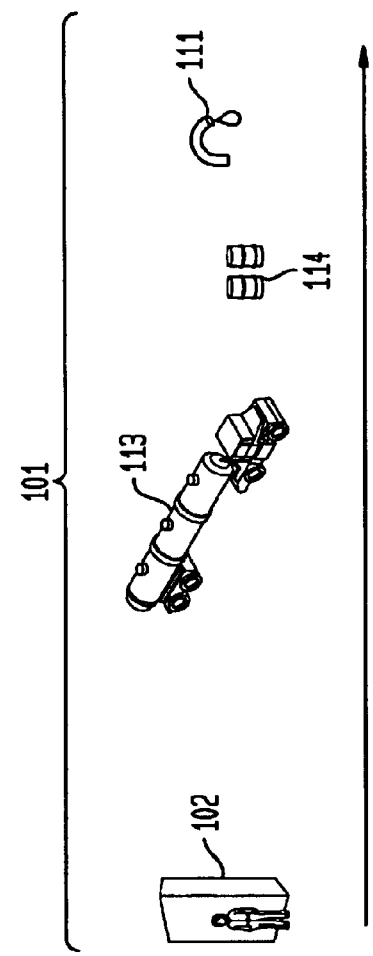
FIG. 1B illustrates a bulk fluid distribution supply chain in accordance with the present invention.

The general methodology 101 of the present invention is illustrated in FIG. 1B. The liquid product remains in bulk form at the supplier 102. Periodically (i.e., from time to time) the product is received in bulk form 113 from the supplier and delivered in bulk form to the customer's on-site mini-bulk storage 114. Infrastructure at the customer's site allows dispensing the product 111 from the mini-bulk storage. Inventory management is accomplished automatically based on the monitoring systems. In short, the present invention takes advantage of the practical differences between liquid and solid products, to achieve large improvements in the delivery and dispensing process. These improvements include (1) deep cost reductions in handling through use of bulk delivery methods; (2) better planning, information, and control through automated monitoring and reordering; (3) highly efficient delivery and dispensing by keeping the fluid in bulk form throughout the process; and (4) higher product quality due to optimized product handling and monitoring.

Figure 2:
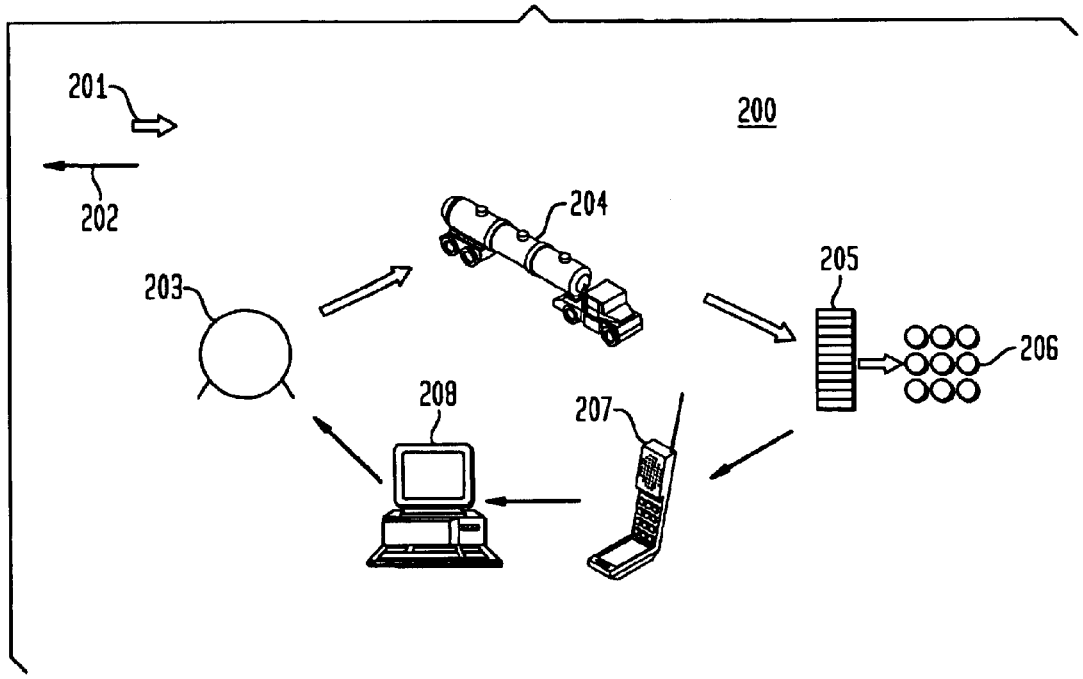
FIG. 2 illustrates the inventory and planning flow of a bulk fluid distribution system in accordance with the present invention.

FIG. 2 illustrates generally the product flow and planning flow of the operation 200 exemplary of the present invention. Shaded arrows 201 represent product flow, and solid arrows 202 represent planning flow. Supplier tanks 203 are typically maintained at the optimal conditions for holding the liquid and thus are preferably mimicked throughout the delivery/dispensing process. For example, if the supplier tanks are constructed of stainless steel, the truck, storage tanks at the costumer facility, and supply lines can be constructed of stainless steel. Furthermore, if the supplier tanks are chilled at 58° F., the other apparatuses may also be chilled to 58° F. Other atmospheric conditions such as exposure to oxygen, humidity controls, etc. may also be emulated throughout the procedure. The liquid is transferred to delivery trucks 204 that contain a configurable series of smaller tanks. This allows multiple liquids to be transported each day, in the quantities required for that day's deliveries. For example, peanut oil, soybean oil, canola oil, olive oil, soda, wine, soft drink syrup, etc. may be distributed via a single distribution tract. Delivery of the different liquids to the customer is preferably made simultaneously, for instance using a multi-line coupler in an external wall of the customer's site to the customer's on-site mini-tanks 205. These mini-tanks may also be reconfigurable so that the quantity of each fluid held on-site may be adjusted as required. From the mini-tanks, the fluid flows to the dispensing system 206 under the control of the customer. The dispense system directs the fluid from the mini-tanks to the point of delivery to the end customer, e.g., a tap or faucet in the case of beverages for general consumption, a spray head in the case of paint, an appropriate nozzle for liquids such as automotive fluids, industrial process, etc. The mini-tanks are preferably equipped with sensors (e.g., integral sensors in the tanks, integral sensors at the dispensing unit, remote sensors, etc.) to collect and transmit data 207 regarding inventory levels for each liquid. The sensors may also collect detailed usage and control status (e.g., temperature, humidity, etc.) information. This information is transmitted to a local data processing system 208 such as a general purpose PC or a specialized data processor, and orders and alerts are generated accordingly. For example, should a low inventory level be sensed and transmitted by means 207, the system 208 can be configured to automatically reorder the appropriate liquids. Additionally, if sensors 207 sense a temperature or other atmospheric condition outside a preset range, the data processor 208 can generate an alarm to alert the appropriate staff. The mini-tanks may also or instead include alarms independent of the data processing 208 system that respond to environmental or other changes.

One illustrative application for the method and system of the invention is in the supply of beverages such as wine or soft drinks to a restaurant. Often a restaurant is forced to open a 0.75 L bottle of wine to provide a wine by the glass to a customer. Depending on the number of glasses purchased during a specific period, such as a day, the restaurant may discard a substantial portion of wine from the bottle. However, the present invention allows a restaurant to properly store and retain the unused wine in the storage mini tanks for an extended period to accommodate the "wine by the glass" operation without requiring the restaurant to discard unused portions, thereby limiting profitability.

Another illustrative use of the present invention may be in the field of consumer home products, such as fertilizer for a customer's lawn. For example, a mini-tank structure may be located at an individual's home. The mini-tanks can be linked to a user's sprinkler system and stored nutrients or fertilizers may be added to the sprinkler flow from the tanks. The application of the fertilizer can be adjusted by the homeowner, either electronically or manually. Alternatively, the supplier may adjust the application times, quantity, etc. via a remote electronic link or other similar apparatus. It is also foreseeable that monitoring apparatus capable of monitoring rainfall, temperature, season changes, insect infestation, and other regional conditions located at the homeowner facility can regulate the introduction of fertilizers, etc. into the system. In addition, an interaction between the supplier and the monitoring apparatus of the homeowner facility may be employed whereby the manufacturer may regulate the application of fertilizers, nutrients, etc. or provide alternate fertilizers based on data returned by the a monitoring apparatus.

Figure 3:
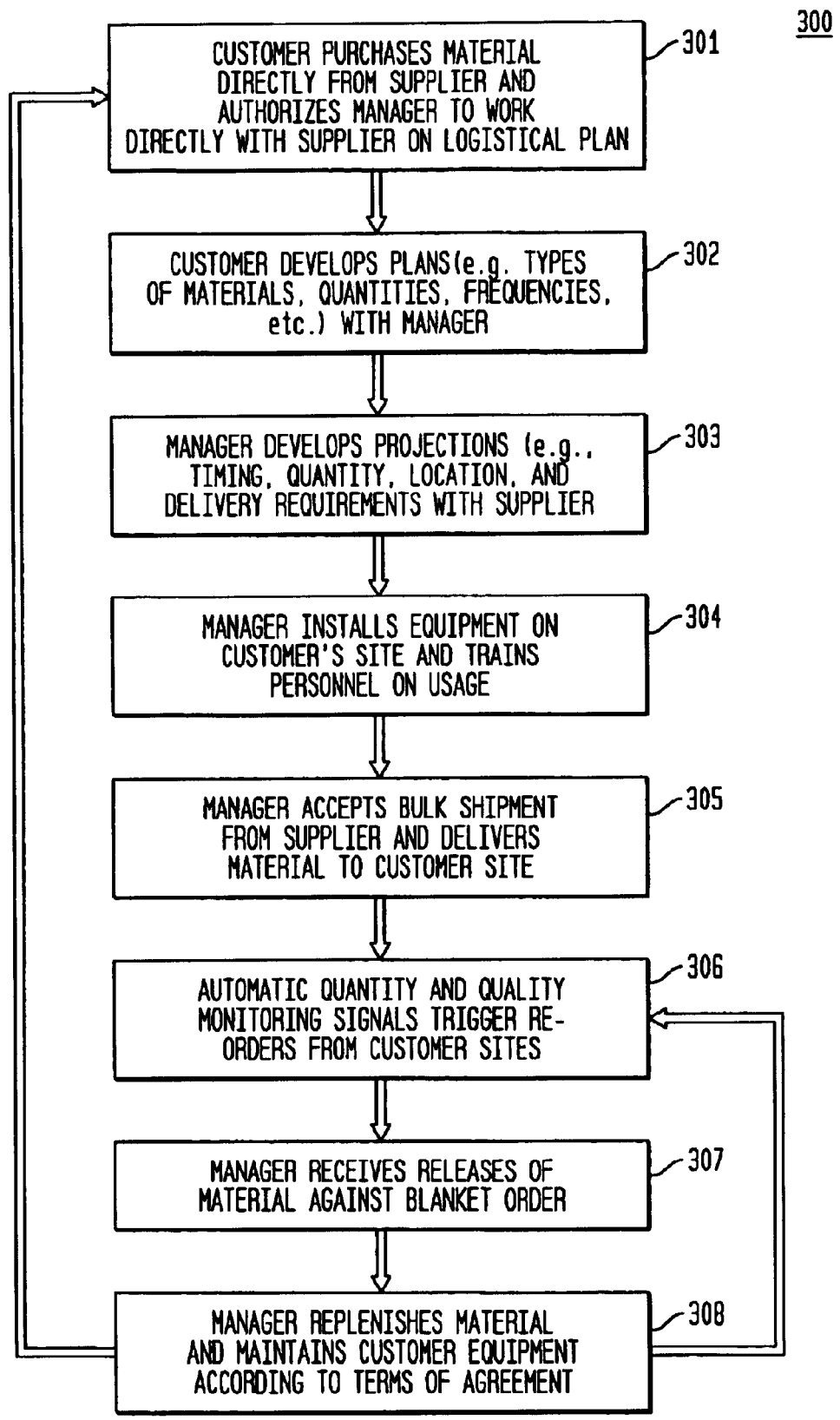
FIG. 3 is a flow chart depicting the relationship between participants in a business model in accordance with the present invention.

FIG. 3 illustrates the business flow model 300 relationship between the participants of a beverage operation in accordance with the illustrative embodiments of the present invention. While product can flow directly from the supplier to the customer, in this illustration the participants are the supplier (the party that is the source of the material, in this case, wine), the customer (the party that purchases and stores the material until consumption) and the manager (the party that orchestrates the relationship between the customer and the supplier). The customer purchases beverages directly from the supplier 301. The manager may be the supplier's agent, the customer's agent or an alternate operator capable of managing the operation. It is also possible that the supplier operates as the manager. It is also foreseeable that the functions of the manager may be conducted by an electronic device capable of interpreting the data. In the illustrated embodiment, the manager never takes ownership of the products, unless, e.g., the manager is also the supplier. The manager reviews beverage usage history and together with the customer develops projections of the timing, quantities, locations, and form of beverage usage at each customer site 302. This information is used to configure the holding equipment at each location (e.g., the total number of mini-tanks and the number of mini-tanks to be used for each beverage, the required flow apparatus, etc.). Usage projections, developed between the manager and the customer, are also used in planning orders and receipt requirements from the supplier 303. Although actual purchase order release quantities are defined immediately prior to receipt, these projections help the supplier plan material availability.

The manager, prior to the delivery of any product, installs infrastructure at the customer's site, and trains personnel on its usage 304. Generally, the infrastructure installed is in accordance with at least the projections made at steps 302 and 303. In addition, the manager is responsible for the maintenance, control, and monitoring of the infrastructure at the customer's premises.

The manager accepts initial shipment of product from the supplier and delivers it to customer sites according to projected requirements 305. As product is consumed at the customer site, remaining beverage inventory is monitored and transmitted to the central information system 306. Processing within the central information system detects the need for replenishment of a specific beverage at a customer site. This detection triggers a release against a purchase order from a supplier, as well as scheduling of the delivery truck to the customer site 307. Finally, the appropriate product is delivered by the manager 308. With this delivery the monitoring/receiving/delivery cycle is renewed.

Figure 4:
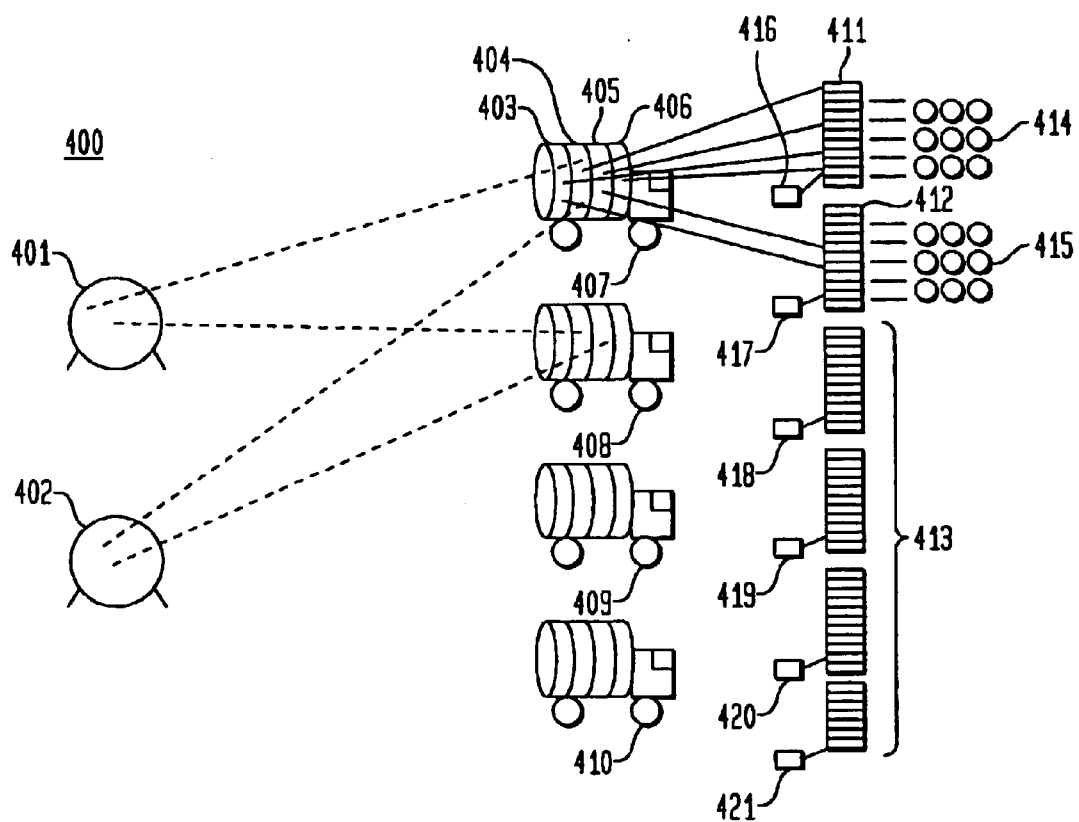
FIG. 4 is a flow chart depicting the physical flow of material in a system in accordance with the present invention.

The physical flow of material 400, illustrated in FIG. 4, follows a path that best retains the product's quality. Normally, this path is one that mimics the environment in which the beverage was held by the supplier. In this example, tank 401 is a large wooden cask for wine. Tank 402 is a large container of stainless steel for holding soft drinks or soft drink syrup. From the supplier's holding method, such as tanks 401 and 402, the product is transferred to trucks, e.g., 407, 408, 409, and 410. The compartments of trucks 407, 408, 409, and 410 preferably match the supplier's holding conditions. Trucks 407 and 408 are loaded according to the quantity of each specific product that will be required for delivery on the next delivery run. The trucks normally include a plurality of distinct tanks, e.g., 403, 404, 405, and 406. The tanks may be constructed as a single unit divided into separate tanks or a plurality of independent physically separate tanks. The tanks may be constructed of different materials, may be of different internal volumes, or may have different internal atmospheres depending on the beverage being transported. These tanks can all hold the same type of beverage, a different type of beverage, or any combination of beverages depending on the types and quantities to be delivered. Each tank can receive product from any of the supplier's tanks, e.g., 401 or 402. The determination of the quantities of each product to be loaded on a truck is made based on automatic quantity and quality monitoring data from customer sites that are transmitted to the central information processing system and monitored by the Manager. Products are then delivered into the holding arrangement at the customer's site, such as arrays of mini-tanks 411 and 412. Again, configuration and environment of the mini-tanks 411 and 412 preferably match those of the supplier 401 and 402 and the trucks 407, 408, 409, and 410.

For example, mini-tank arrays 411 and 412 can be wooden, stainless steel, or any combination thereof. Furthermore, individual tanks can vary in size, composition, and environmental conditions (or limits thereof) within the array. Finally, beverages are dispensed to the end consumer 414 and 415 through appropriate dispensing equipment.

Appropriate monitors 416, 417, 418, 419, 420 and 421 sense inventory status (e.g., quantity, pressure) and quality (e.g., chemical analysis, pH, viscosity, temperature) conditions in the mini-tanks. Monitors 416, 417, 418, 419, 420 and 421 may be placed throughout the physical flow as required in order to ensure product quality, proper quantity, etc. In case of emergency or other unforeseen need, the Manager can maintain a reserve of material within trucks 409, 410, and/or the customer can maintain additional mini-tanks 413.

The monitors 416–421 may comprise a variety of sensors for sensing a variety of conditions and material properties. In that regard, disclosed are examples of properties and sensors for their monitoring. Of course, the following is not exhaustive, but merely representative of what has been contemplated for use with the present invention.

For sensing concentration (e.g., to ensure proper balance of soft drink syrup to carbonated water) or purity (e.g., to ensure that the infrastructure has not been compromised in any way), photometric analyzers, such as those made by Optek® are contemplated. Photometric analyzers utilize the properties of light transmitted through a fluid to extract data useful for quality control.

For sensing viscosity (e.g., to ensure a fluid is being held at proper temperature or to detect spoilage), viscometers are contemplated. Models such as the AST-100® from Brookfield® Engineering are appropriate, and have been contemplated for use with the present invention.

For measuring temperature (e.g., to ensure proper storage and dispense conditions), standard thermometers, thermocouples, and thermistors are contemplated. Particularly, thermocouples and thermistors by Watlow Electric Manufacturing Company have been considered appropriate means for sensing temperature. Furthermore, thermistors in a self-heating configuration can be useful for liquid level detection.

For measuring the volume of fluid on hand, one or more standard mass scales can be used to measure the mass of each or a group of mini-tanks. Of course, the mass of the mini-tank(s) and associated hardware has to be deducted from the measured mass. Then, the density of the fluid can be entered into the system, thereby providing an accurate reading of on-hand fluid volume.

Flow rates can be measured using standard mass flow meters. Measuring flow rates is useful for monitoring the inventory entering, exiting, and flowing through the system. Turbine mass flow meters from DigiFlow Turbine Mass Flow Meters, particularly the DFS-20 series, are contemplated means for measuring flow rates in the present invention. These flow meters can be configured to measure flow rate and/or total quantity of fluid.

For sensing humidity (e.g., to ensure proper storage conditions), relative humidity sensors are contemplated. Particularly, the ACI/RH series from Automation Components Inc. are considered appropriate for use with the present invention. Such sensors transmit either a voltage or current level to the PLC representative of the sensed humidity. To sense pH levels (e.g., to ensure proper storage of fluids and to detect spoilage), pH meters are contemplated. Models such as the Sper Scientific Ltd. 840035 Advanced pH Meter are considered appropriate for use with the present invention.

The material planning flow works in the opposite direction of the material physical flow. Based on projected consumer consumption, the number and configuration of mini-tanks 411, 412, and 413 per product per period of time are determined. Usage rates and number of customers define projections of the number of trucks required, as well as the quantity of product to be released from the supplier per period of time. This processing is performed by distribution requirements planning software in the central information system. This processing is operated and maintained by the manager.

Trucks carry a set of tanks that may be configured as required for each delivery run. Configuring the tanks may require the connection of a plurality of tanks together in order to give a different total capacity for each material.

The material used for the tanks and interconnections varies based on application. Some beverages require stainless steel-only construction, while others are much less demanding. Some beverages need to be held under pressure with specific gasses, while others do not have this requirement. Some beverages may need to be held in temperature-controlled (e.g. refrigerated) conditions.

Figure 5:
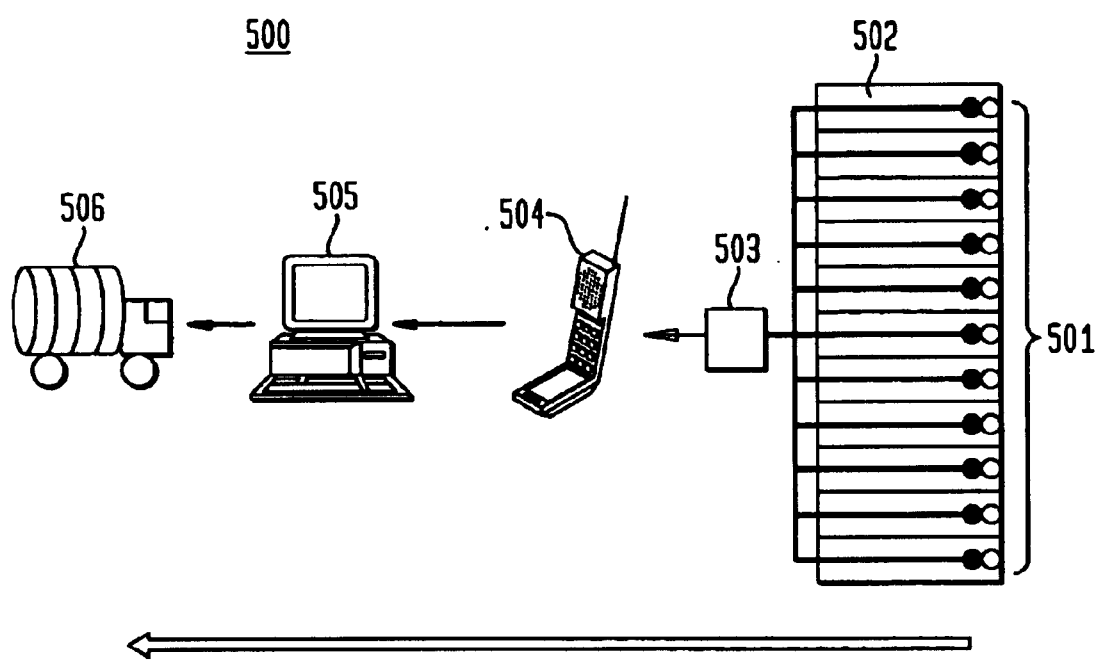
FIG. 5 is a flow chart depicting the process of material re-ordering.

The process of the material re-order flow is performed through automated methods illustrated in FIG. 5. Sensors 501 in the mini-tanks 502 at the customer site provide periodic readings regarding inventory levels and other data. The intervals of these readings may be regulated based on the turnover rate of the liquid at the customer facility. Alternatively, sensors 501 can be attached to the liquid lines. These data are processed through a PLC (programmable logic controller) 503 and transmitted via a communication link 504 such as a telephone line 504, or internet connection or manually, to the central information system 505. Different types of PLCs can be employed, but in many instances an important feature is its ability to interface with a variety of sensors. The central information system 505 processes information from the sensors 501 and detects exception conditions or action requirements. Based on these conditions, the central information system 505 generates actions such as releases against purchase orders, delivery scheduling, etc. Thus, the central information system 505 can effect automated delivery of product 506 based on data from sensors 501. The central information system 505 is preferably embodied in standard ERP software. An example of suitable ERP software is Optima Priority from Silverbyte Systems Ltd.

Figure 6:
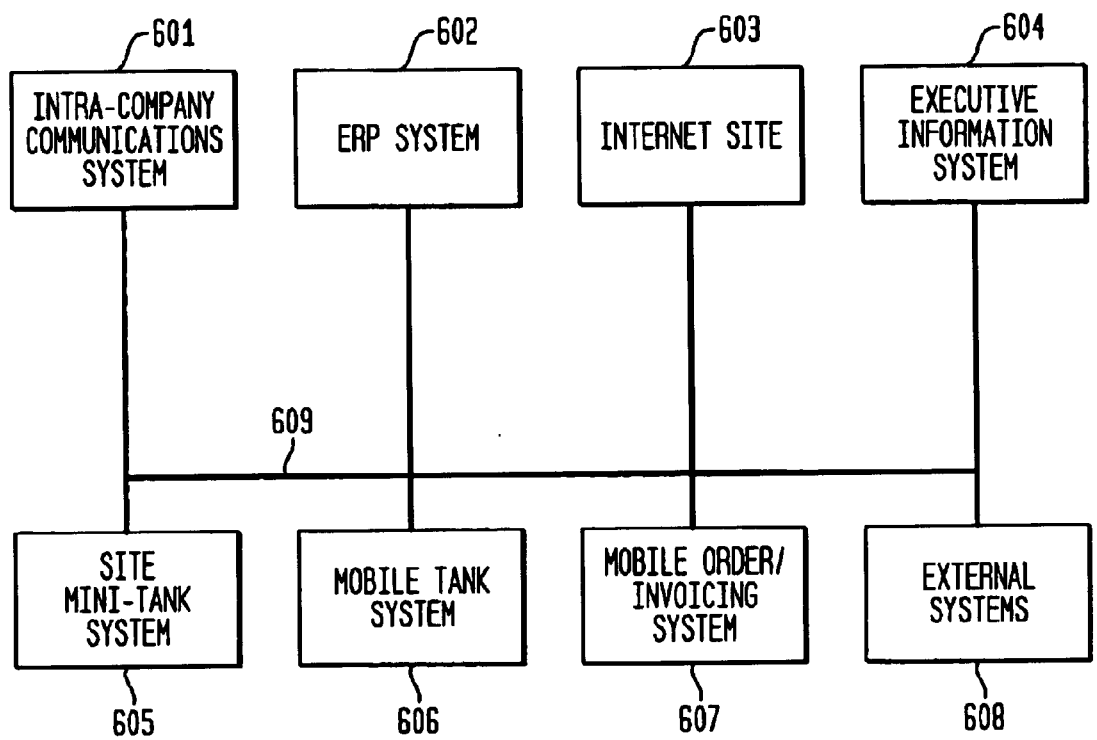
FIG. 6 is a block diagram depicting the information systems of the present invention.

The information and communications systems of a preferred embodiment of the present invention are illustrated in FIG. 6. All systems can interface via a voice/data backbone 609. Voice/data backbone 609 can be, e.g., the public telephone system (PSTN), a LAN, a WAN, or wireless system. On the manager side, intra-company communications 601 support coordination of activity between the operators of the system. Such communication can include e-mail, centralized calendaring, voice, fax, and data. The ERP central information system 602 performs functions such as centralized inventory, order, and accounting processing. Internet site 603 allows customers and suppliers to retrieve information from the manager, such as delivery dates, and inventory status. Customers can also place orders (which are preferably forwarded to the supplier) through the internet site 603, and communicate with supplier staff. Additionally, customers can update their usage data manually or automatically via the internet site 603. Executive Information System 604 provides internal information to certain of the suppliers or Manager staff. Such data could comprise summaries or details of product balances, usage, quality, or other such data captured within the system.

Monitoring systems at the customer site 605 effect generation of and access to data relating to the mini-tanks and other such infrastructure associated with the present invention. Various sensors may be disposed in and around the tanks to monitor temperature, humidity, and other such environmental factors. Also, inventory can be monitored through flow sensors and other such apparatus. Trends of product usage can then be used to generate data to assist the customers in making product selections. This data can also effect automatic product reordering.

To ensure quality throughout the process in the preferred embodiment of the invention, monitoring systems in the trucks 606 keep record of the material's condition during transport. Also, flow sensors are included to determine amount of product delivered to a customer site, which is useful for billing and generating market data.

In the preferred embodiment, mobile monitoring system 606 is part of the mobile order/invoicing system 607. Data gathered from the mobile monitoring system 606 is used to generate invoices, order records, and other such data upon, after, or before material delivery. Hard copies of such data are commonly provided to the customer by conventional means.

External systems 608 provide miscellaneous support to the supplier or manager staff, such as truck routing via GPS, maintenance scheduling for customer site infrastructure, human resources information, etc. Preferably, different portions of the data available via the voice/data backbone 609 is accessible by different persons depending on their needs.

Figure 7:
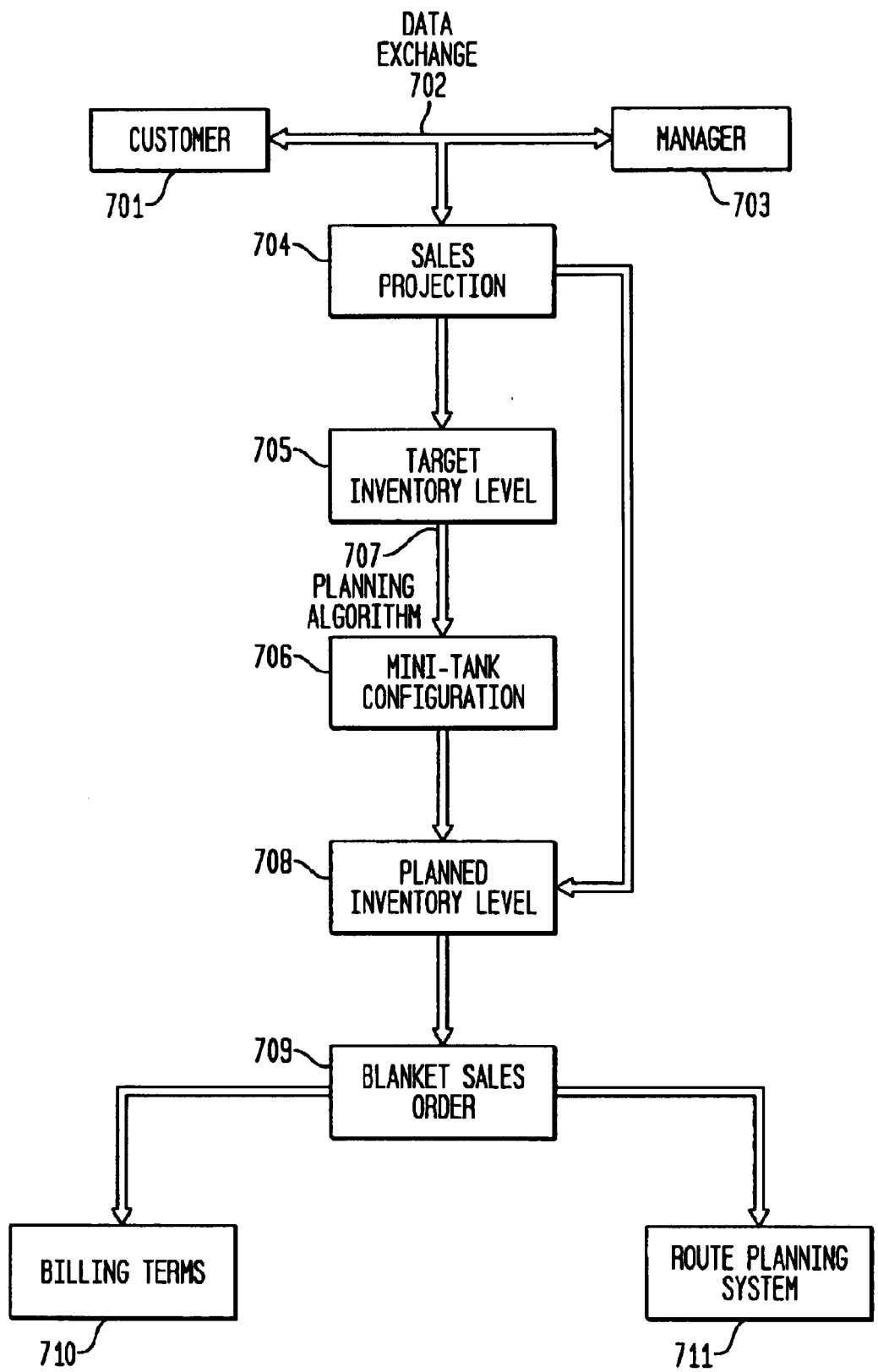
FIG. 7 illustrates a preferred method for customer setup and order placement for a single account.

The preferred method of beverage customer setup and order placement for a single account is depicted in FIG. 7. For example, a beverage customer may be a multi-location company or chain, or it may be an individual site or establishment. Within a multi-location company or chain customer, there may be many individual site or establishment locations. Generally, for each account, a separate sales projection is developed. A sales projection is a weekly projection of sales by beverage type for each account. The sales projection per account 704 is developed by the customer 701 working with the manager 703 by transferring data 702 from the customer regarding account-specific sales projections. The sales projection per account 704 can be updated periodically by accepting updated data from the customer 701. In other words, data exchange 702 can be, and preferably is, a real-time constant process. Based on the sales projection for an account 704, the target inventory level 705 for each beverage type within an account is defined. In this example, the target inventory level represents six weeks of inventory. In such a case, a normal delivery cycle consists of a delivery every fourth week and a safety stock sufficient for two additional weeks. Based on the target inventory level 705 for an account, the mini-tank configuration 706 per month for that account is defined by processing the target inventory level through a planning algorithm 707 to divide the mini-tanks among the beverage types. The planning algorithm 707 is preferably computer-based, however, manual computation is also contemplated by the present invention.

The mini-tank configuration 706 specifies how many mini-tanks within that account are dedicated to each of the beverage types defined in the sales projection 704. Higher-volume beverages are allocated more mini-tanks or potentially larger mini-tanks than lower-volume beverages types because of their larger inventory requirements. Changes to the mini-tank configuration 706 may be projected based on shifts in the target inventory level 705 and can be developed periodically.

Based on the mini-tank configuration 706, a planned inventory level 708 is developed for each account for each week. The planned inventory level 708 is found by reducing the inventory parameters (the maximum quantities dictated by the mini-tank configuration 706) by the sales projection 704, and increasing them to the maximum inventory level in the week defined as the delivery week for the account in the route planning system 711.

A blanket sales order 709 (i.e., a sales contract having an agreed-upon duration) is typically entered for each account. The blanket sales order 709 defines at least the total quantity of each beverage to be delivered. The blanket sales order 709 is generally for monitoring deliveries against a sales order created as a result of the sale of beverages by and between the supplier and the customer.

Pricing structures may be different for different accounts. For example, pricing may be per unit (e.g., per gallon), per delivery, based on specific discounts, etc. Also, the mode of billing may vary per client. Some clients may have C.O.D. accounts, others may have lines of credit, etc. The pricing structure and modes of billing, both of which are conventionally reflected in the blanket sales order 709, are entered into the system as billing terms 710. In addition, geographical location of the account and delivery dates are loaded into the route planning system 711.

Figure 8:
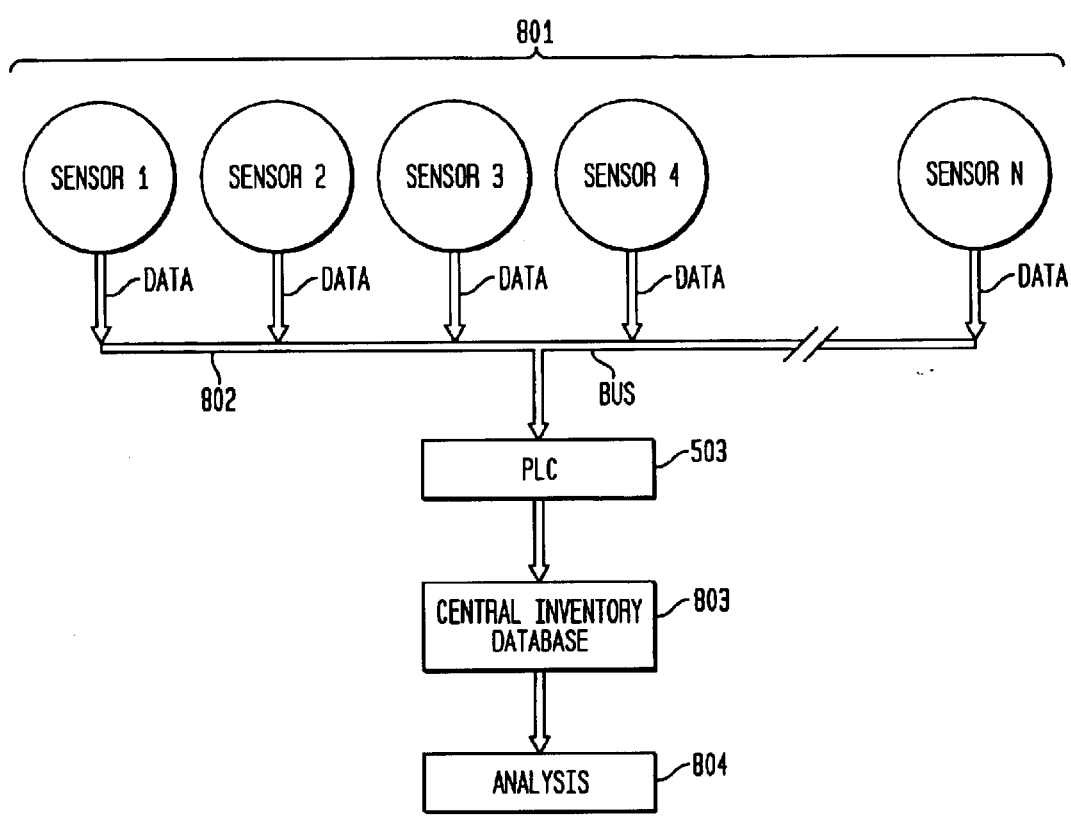
FIG. 8 illustrates a preferred arrangement of monitoring devices in accordance with the present invention.

FIG. 8 illustrates a preferred arrangement of mini-tank monitoring devices in accordance with the present invention. Monitoring devices on the mini-tanks (not shown) monitor beverage quantity, surrounding temperature, humidity, and other data of interest. Sensors are connected together via bus 802. Bus 802 can be any feasible type of interconnection, for example, a computer network via coaxial cable, twisted pair, wireless, a WAN, the Internet, or alternatively, the telephone network (PSTN). The bus 802 can either be part of or interfaced with the PLC 503. The PLC 503 converts the raw data from sensors (e.g., a voltage level) into an electronic signal representative of the sensed data. For example, a flow meter may generate a 0.45 V signal which (based on a calibration procedure) the PLC 503 outputs a reading such as "3 gallons per minute." Readings are taken periodically and transmitted from PLC 503 to the central inventory database 803. The data transmission preferably includes account number, tank number, date, time, and a numerical value representing each of the data elements monitored. The data is transmitted via wireless, landline telephone connection, or other method. The data is preferably filtered for errors before being loaded into the central inventory database 803. Information in the central inventory database 803 is available for analysis by the manager staff as well as for preparation and presentation to customers. Information is processed with each receipt of data (to identify and present alarms for immediate problems). In addition, information is processed in a predetermined interval, such as daily, biweekly, etc. to identify operational issues such as pending out-of-stock condition, exceptions of actual usage versus the sales projection, need for changes to the mini-tank configuration, etc. Pending out-of-stock conditions are based on minimum inventory balances defined for each material type.

Figure 9:
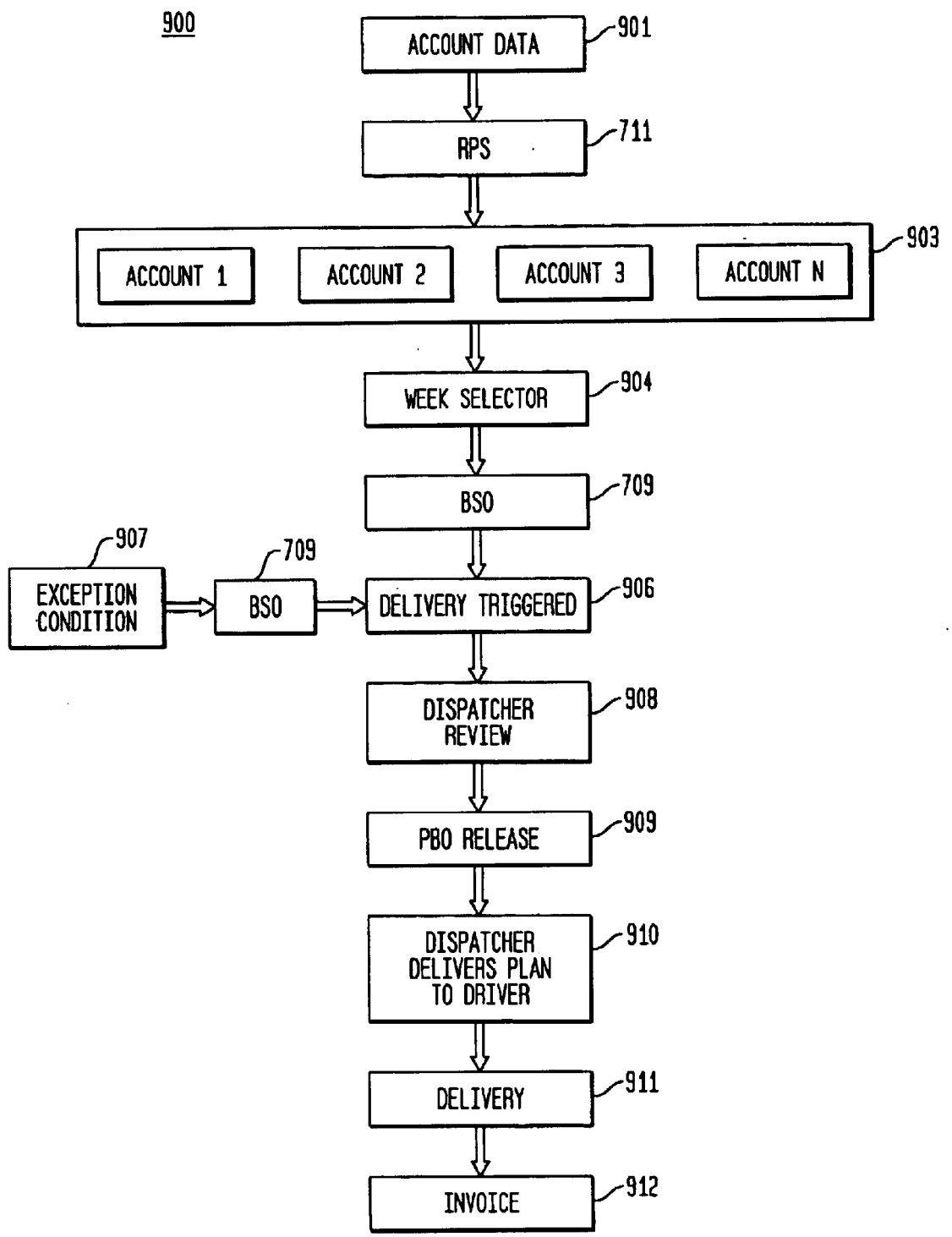
FIG. 9 illustrates a process for delivering material to mini-tanks at the customer site.

FIG. 9 illustrates the preferred delivery method 900 for delivering material to mini-tanks at the customer site. The route planning system 711 receives account data 901 and groups accounts by geographic location and volume, with an average monthly volume determined per account. A group represents one truck's accounts. Herein, exemplary group 903 consists of accounts 1 through N. These accounts 903 are then sub-divided into groups based on geographic location and volume, and assigned a delivery week per month (week 1, 2, 3, or 4) by week selector 904. Each sub-group represents one truck's accounts per week.

When a delivery is triggered 906, a delivery plan is formulated. The delivery plan preferably comprises all essential data regarding the truck's deliveries for the day. Generally, a delivery may be triggered 906 by the normal delivery rotation (e.g., delivery to each account once per month, based on the route planning system 711), or by an exception condition 907 such as a pending out-of-stock notification. Exception conditions are usually a result of on-site monitoring (such as inventory depletion or spoilage). All deliveries are filtered through the parameters of the blanket sales order 709 for each account, so that deliveries are not planned beyond the quantity or time specified therein.

Preferably, delivery planning is done in the middle of a week for the following week's deliveries. This allows for adjustments as day-to-day demand varies, and further allows for planning of the purchase blanket order release 909 needed for truck re-filling. The dispatcher reviews the delivery plan 908 for the following week, and makes adjustments as required. When the delivery plan is finalized, the dispatcher triggers the purchase blanket order release 909 process, which consists generally of dispatcher 910, delivery 911 and invoice 912.

Each day the dispatcher transmits the delivery plan to the driver for the following day 910. The driver delivers the beverages according to the delivery plan 911 each day. An invoice is generated 912 for the customer based on the beverages delivered to an account. Preferably, this invoice is for delivery services and not for the beverages themselves, which are billed directly by the supplier, however, alternative invoicing methods are contemplated by the present invention.

Figure 10:
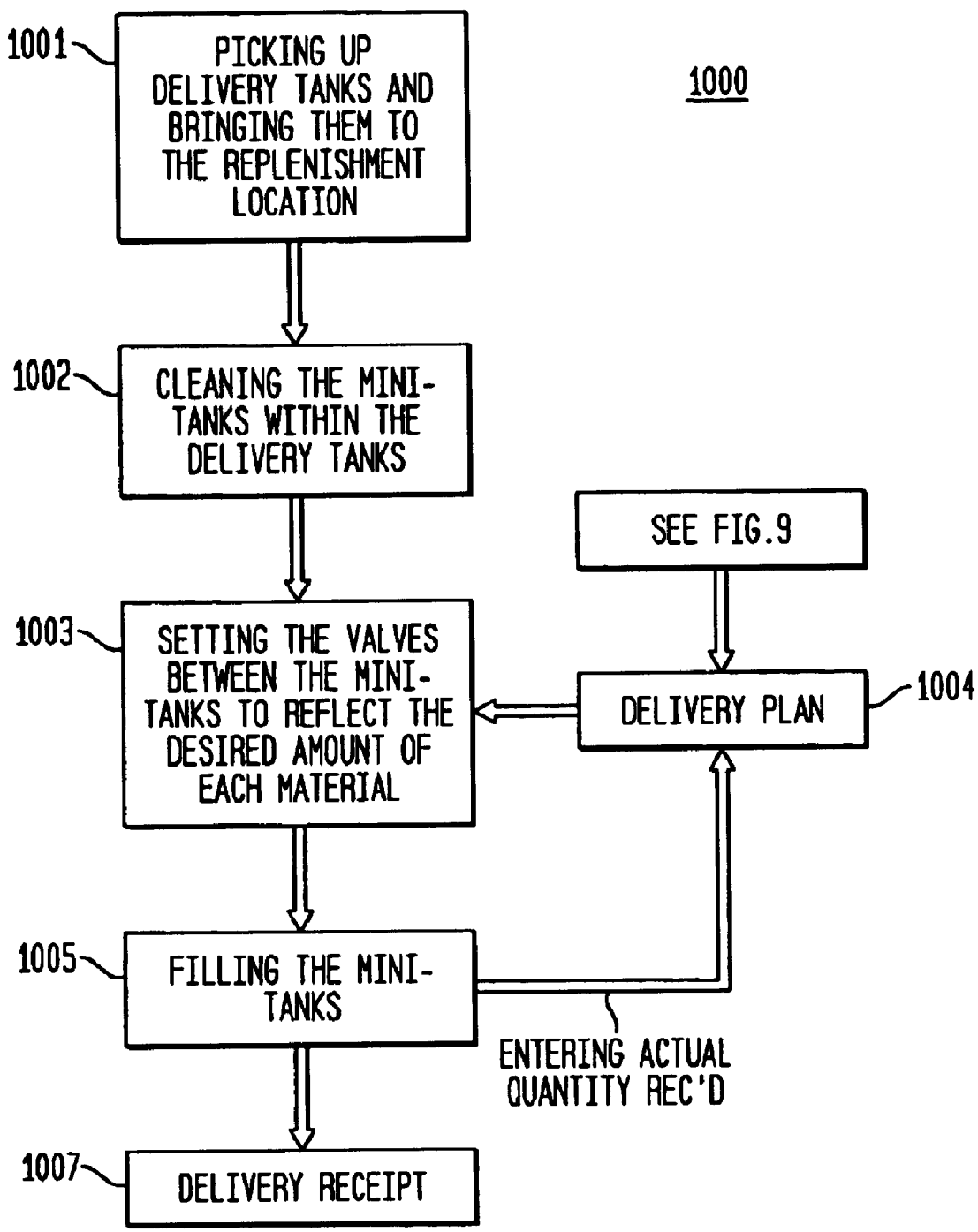
FIG. 10 illustrates a preferred material replenishment process.

Beverages may be purchased directly by the customer from the supplier, or may be sourced and branded by the manager upon order by the customer. In either case, beverages are held at the supplier until released as described in FIG. 10. FIG. 10 depicts a flow chart of the preferred replenishment process 1000. The replenishment process 1000 is the process for refilling empty truck tanks. For purposes of the disclosure, in this example two trucks are in a rotation—on the day one truck is delivering beverages, the other truck is being returned, cleaned, and sent to the replenishment location, i.e., where the truck is refilled. Alternatively, the rotation may be time-based, with trucks alternating between delivering during the day and being refilled at night. Regardless of the rotation schedule, the preferred replenishment process 1000 begins with picking up two delivery tanks and bringing them in tandem by one cab to the replenishment location 1001. There, the mini-tanks within the delivery tanks are cleaned 1002. Generally the tanks are refilled with the same type of beverage, i.e., tanks holding soft drink syrup are refilled with soft drink syrup, and those holding merlot are refilled with merlot. However, it is contemplated by the present invention that the tanks may be cleaned using advanced cleaning techniques common in the art allowing for the refilling of the tanks with different beverages.

Next, to ensure that each mini-tank at the customer site is filled with the proper quantity, valves are set between the mini-tanks 1003 to reflect the amounts of each beverage type to be filled based on the following day's delivery plan 1004. The delivery plan 1004 is preferably formulated in accordance with preferred delivery method 900 of FIG. 9. The mini-tanks are then filled 1005 and the actual quantity filled is recorded in the delivery plan 1004. Thus, in case there are any shortages at the supplier, the delivery plan 1004 reflects such conditions. Preferably, each truck comprises its own PLC to effect interfacing with sensors such as flow meters or the like to measure the actual delivered quantity. Alternatively (or additionally), the customer site can utilize flow meters or the like to measure the quantity received and the truck can interface with the customer site sensors or PLC to receive data regarding the delivered quantity. Last, a delivery receipt is recorded 1007 for the quantity of each beverage replenished.

Figure 11:
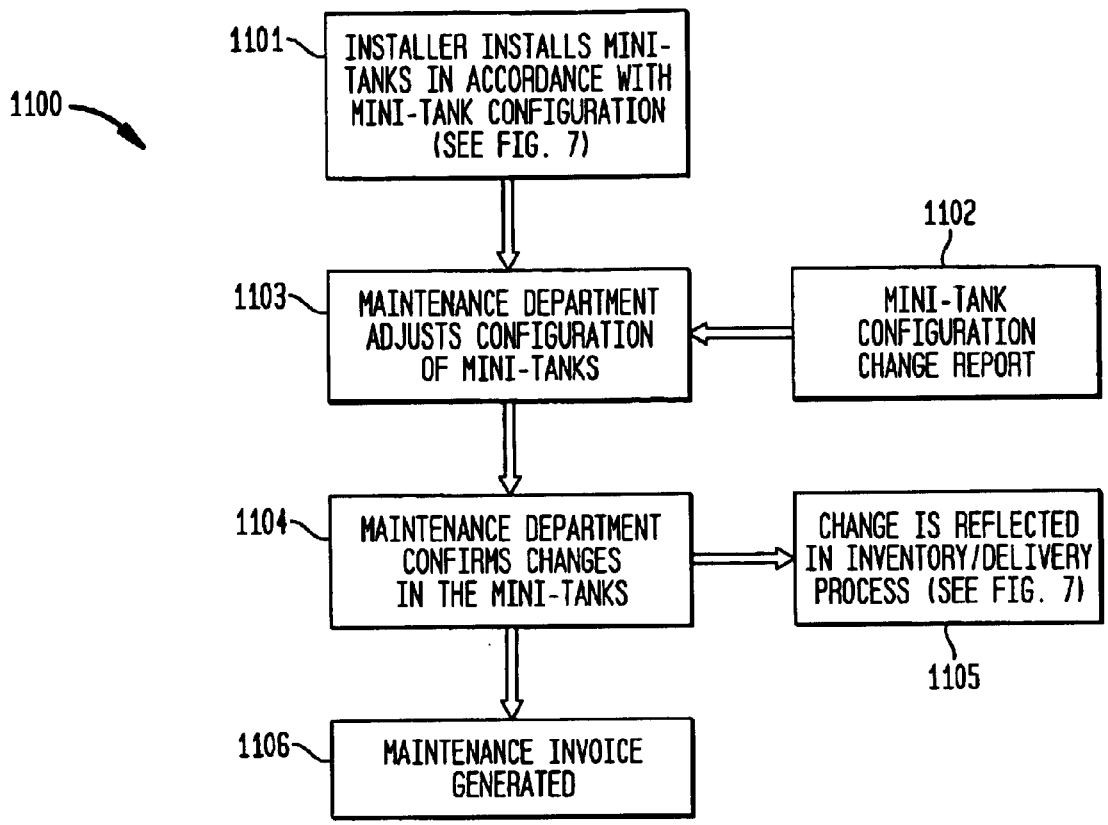
FIG. 11 depicts a preferred methodology for installation of customer site infrastructure.

FIG. 11 depicts the preferred installation methodology 1100 for the installation of customer site infrastructure in accordance with the present invention. The installer installs and configures the mini-tanks in accordance with the mini-tank configuration 1101 (see item 706 of FIG. 7 and associated text). This installation 1101 includes such things as associating line numbers with one or more mini-tanks, installing the proper number of mini-tanks in each line, and installing mini-tanks of the proper size. If necessary, the maintenance department adjusts the configuration of the mini-tanks 1103 in accordance with a mini-tank configuration change report 1102. This adjustment 1103 includes transferring beverages from the changed mini-tank to a different tank, cleaning the emptied mini-tank, and adjusting the line scheme and PLC (programmable logic controller, see item 503 on FIGS. 5 and 8, and associated text) settings on the mini-tank as required so that beverages will be loaded into the correct mini-tanks during the next delivery. Next, the maintenance department confirms that the change has been executed 1104, and ensures that it is properly reflected in the inventory/delivery planning process 1105 (see FIG. 7). Last, an invoice is generated 1106 for all installed equipment and adjustments, based on the billing method previously defined.

Figure 12:
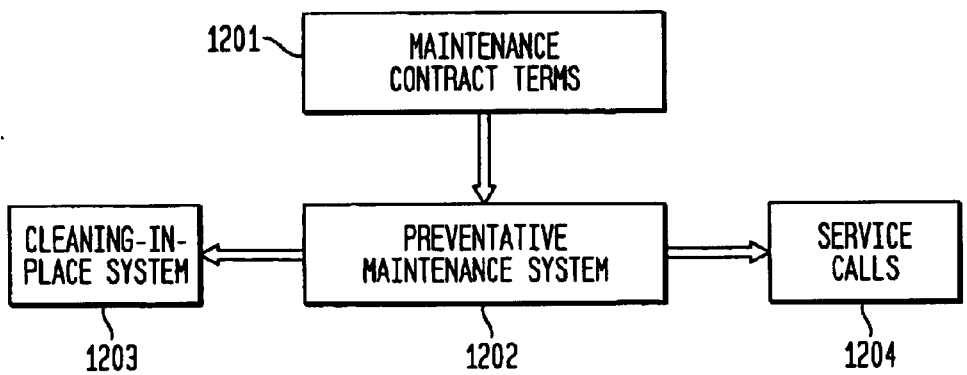
FIG. 12 depicts a preferred methodology for performing periodic maintenance of customer site infrastructure.

Periodic preventive maintenance is performed in accordance with the preferred methodology illustrated in FIG. 12. Maintenance contract terms 1201 are arrived at between the customer and the supplier or Manager. These terms are entered into the preventive maintenance system 1202. This preventative maintenance system 1202 performs scheduling of service calls 1204 and activation of the cleaning-in-place system 1203. It is contemplated that the preventative maintenance system be part of the external systems. The preventative maintenance system 1202 is connected to voice/data backbone (609 of FIG. 6), and is capable of being accessed for the dispatching of service calls 1204 via the telephone network, a WAN, a LAN, and/or other such means. Furthermore, the preventative maintenance system 1202 can thus remotely activate the cleaning-in-place system 1203. The cleaning-in-place system 1203 is part of the customer site infrastructure and performs rudimentary cleaning of various parts of the infrastructure. For example, valves that tend to clog can be automatically cleaned after closing every day via the preventative maintenance system 1202. This can be accomplished by flushing a high-pressure fluid through the valve. To test whether the valve is clean, a flow meter, in conjunction with a source of fluid flow, can test whether the fluid is passing through the valve without excessive flow rate attenuation. Instead of being remotely programmed, the preventative maintenance system 1202 can be programmed by the PLC at the customer site to perform such functions.

Figure 13:
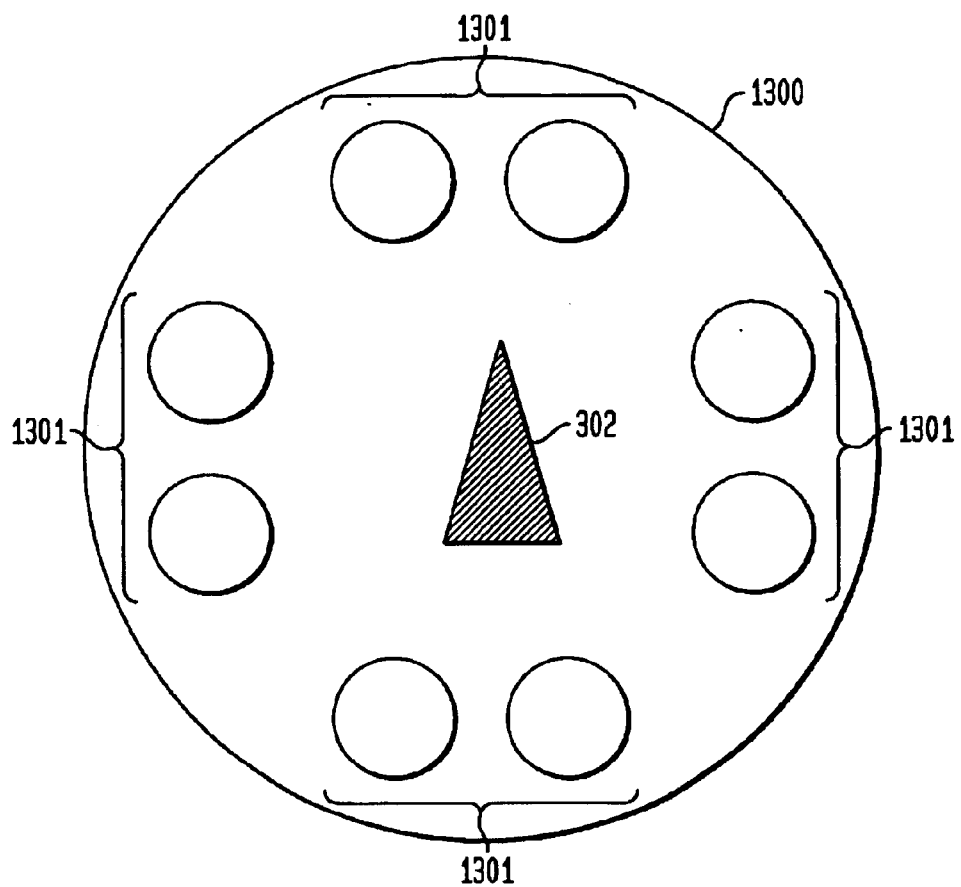
FIG. 13 depicts a preferred embodiment of a coupler.

The flow of beverages into the system from the trucks and out of the system is measured by flow meters or related technology. Meters record the quantity of beverage for each of the lines/products during the filling process, as well as the quantity delivered at every stop. The delivery hose connected to the trucks is preferably extendable in order to connect it to the coupler on the establishment wall through which beverages are delivered. A preferred embodiment of a coupler is illustrated in FIG. 13. Coupler 1300 is generally circular in nature, and has a plurality of tubes 1301 associated with each of the different fluids in the tanks on the truck. The coupler 1300 utilizes a key 1302 (e.g., an isosceles triangle), to ensure that the coupler 1300 can be inserted in only one orientation. Alternative embodiments of the coupler 1300 are contemplated, and include variations in which different coupler shapes are used to distinguish between different tank configurations.

Moving the beverages from the truck to the on-site system frequently requires a propellant to place pressure on the fluid. Alternatively, the system could be gravity fed. Because the on-site system frequently uses a pressure propellant, the pressure from the truck is preferably somewhat higher than would otherwise be needed. Generally, the preferred propellant varies with the beverage type. For example in the embodiment described herein, the use of a gas propellant, as opposed to pumps, is preferred. Types of propellants include: compressed gas; generated gas, i.e., from nitrogen separators; air or other gas pumps; and screw pumps or other mechanical pumps. The propellant is applied to each of the lines. Preferably, there is room on the truck for propellant equipment as required, as well as power, water, etc. as required.

Further, the present invention can include the capability to remove fluid from the site. For example, some lines may be dedicated to delivery and some to removal. Removed fluids are propelled from the site, and the truck is configured to measure the received material, exhausting air or gas during the receiving process.

Figure 14:
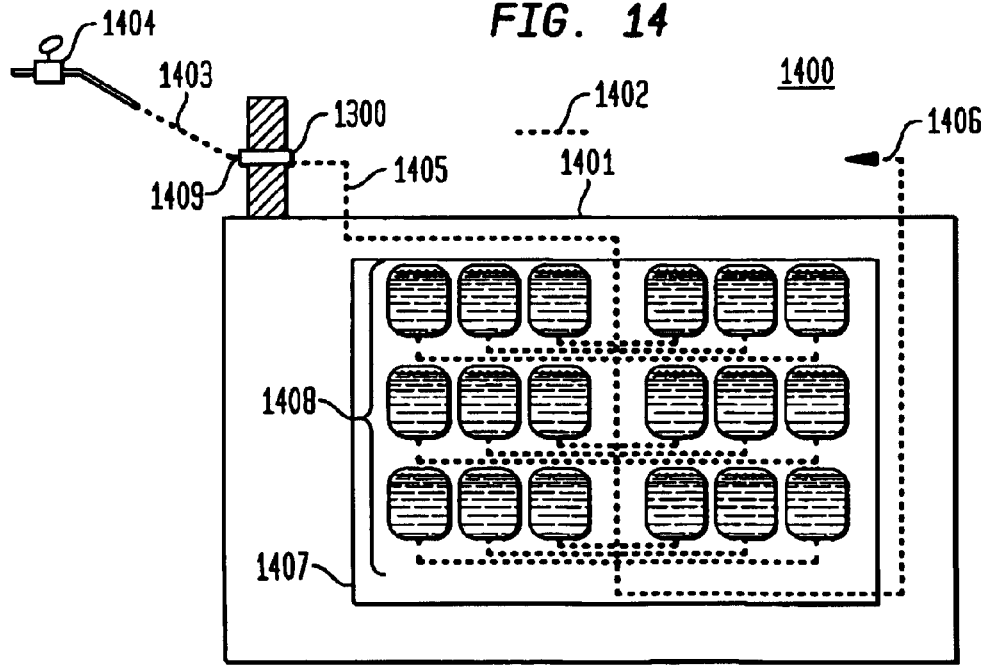
FIG. 14 depicts a preferred embodiment of the on site infrastructure.

FIG. 14 illustrates a preferred embodiment of the customer's on-site infrastructure 1400 in accordance with the present invention. Linetype 1402 illustrates beverage lines, i.e., one, or preferably more, lines of piping or conduit through which the beverages travel during delivery, removal, and dispensing. The beverage lines can be constructed similarly to tubes 1301 of FIG. 13. Beverages are delivered (and removed) from the site 1401 via the delivery truck hook-up line 1403. Delivery truck hook up line 1403 couples to the customer site 1401 via coupler 1300 (taking the exemplary form illustrated in FIG. 13). Coupler 1300 is preferably disposed on the outside wall of customer site 1401. As described above, this allows for more convenient and efficient product delivery. To protect the coupler 1300 from such things as vandalism, decay and various atmospheric elements, it is preferably encased in secure box 1409. Secure box 1409 may be constructed of any material capable of protecting coupler 1300. Primary line 1405, connected to coupler 1300, is situated inside customer site 1401 and runs into the mini-tank storage area 1407. Inside the mini-tank storage area 1407, a plurality of mini-tanks 1408 are disposed. The mini-tanks 1408 can be mounted or arranged in a variety of ways such as wall-mounted (as shown), floor mounted, stacked, shelved, cabled, etc. Of course, the dimensions of the mini-tank storage area 1407 vary with the mini-tank configuration. Multi-conduit dispense line 1406 exits mini-tank storage area 1407 and is coupled to taps for dispensing the beverages held in mini-tanks 1408. Taps and associated dispense lines 1406 may take the form of a variety of configurations and may be any series of lengths and dimensions suitable for the specific user facility. When a delivery is made (as described in FIG. 9) the driver utilizes a flow meter 1404 to dispense the quantity of each of the products flowing through primary lines 1403 according to the quantity listed on the delivery plan for that account. Preferably, this process is automated. Beverages should not be dispensed during filling due to higher system pressure. Thus, filling is best done during off-peak hours. However, this limitation can be addressed by installing pressure regulators on the dispense lines 1406 to prevent excess pressure from reaching the taps or like apparatus.

Next, the driver connects the truck hose 1403 to the coupler 1300. The driver initiates the transfer of products according to the quantities defined. The driver records the completion of the delivery and any exceptions to the quantity delivered from the quantity on the delivery plan (see FIGS. 9 and 10, and associated text). Finally, the driver disconnects the truck hose 1403, closes the coupler 1300, closes the coupler box 1409, and returns the hose 1403 to its position on the truck.

Figure 15:
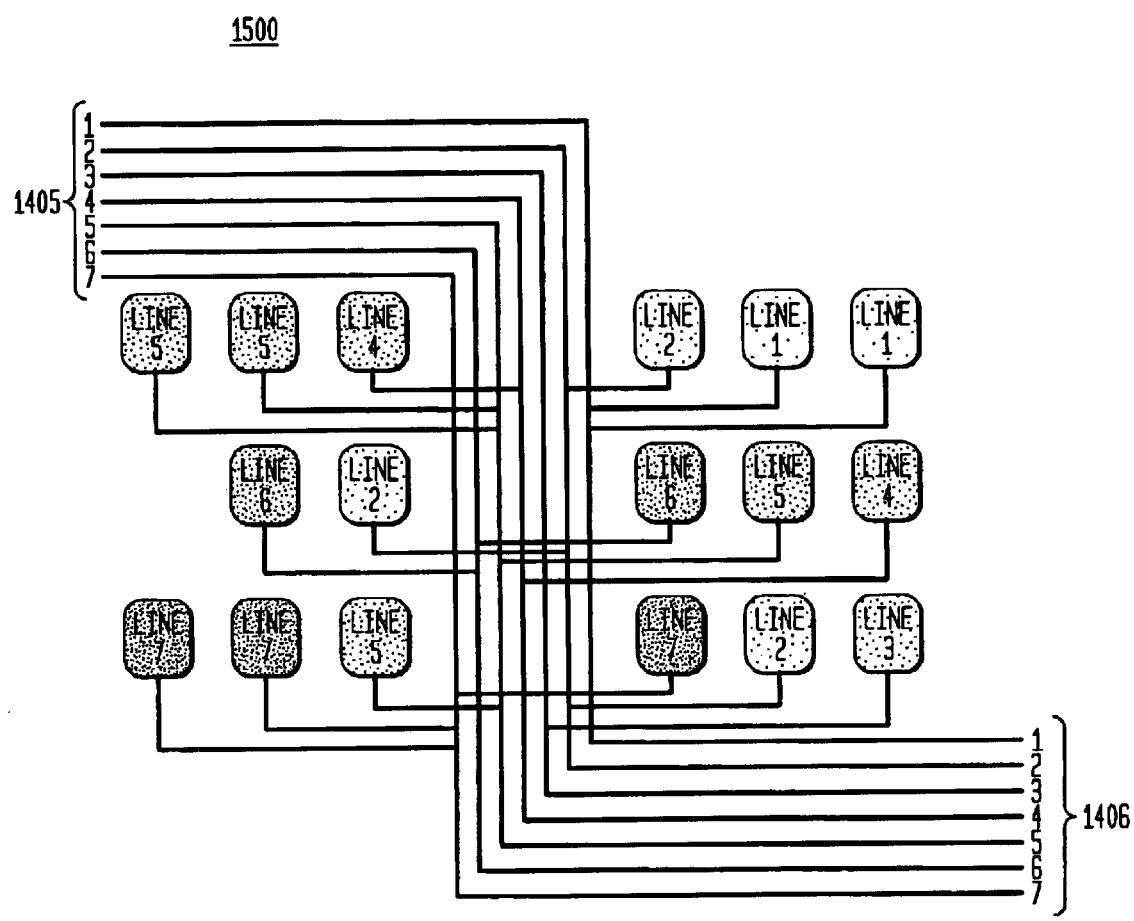
FIG. 15 depicts an arrangement of mini-tanks.

FIG. 15 illustrates an arrangement of mini-tanks 1501 in greater detail. As before, beverages are delivered or removed via primary line 1405, and dispensed via dispense line 1406. Here, however, primary line 1405 and dispense line 1406 are shown divided into seven individual lines. Although seven lines are shown, numerous configurations are possible depending on the required flow volume or product type in accordance with the objectives of the present invention. Each of the individual lines one through seven is coupled to an associated group of mini-tanks. For example, line five, which in this embodiment receives a high-volume product, has four mini-tanks connected for storage. Line three, however, receives a low-volume product, and thus only has one mini-tank coupled for storage. Importantly, because the coupler (e.g., FIG. 13) is designed to permit only one orientation, fluids are pumped into the proper tanks. For example, the beverage for line five can be delivered only to its apportioned tanks because the coupler design precludes mating of line five to any other line in the truck.

The mini-tank system 1500 preferably uses as tanks containers that are optimized for each of the beverages. In many instances, standard thirty liter barrels are suitable. The storage conditions should be such that the liquid stored in the tanks should not degrade over time, at least for the cycle time of the system (typically 5–6 weeks). To this end, the last tank of a line for a given liquid should be physically lower than the rest of the tanks on that line in order to promote complete usage of older liquid. However, various pressurization techniques or other similar techniques may be utilized to obviate this concern.

Figure 16:
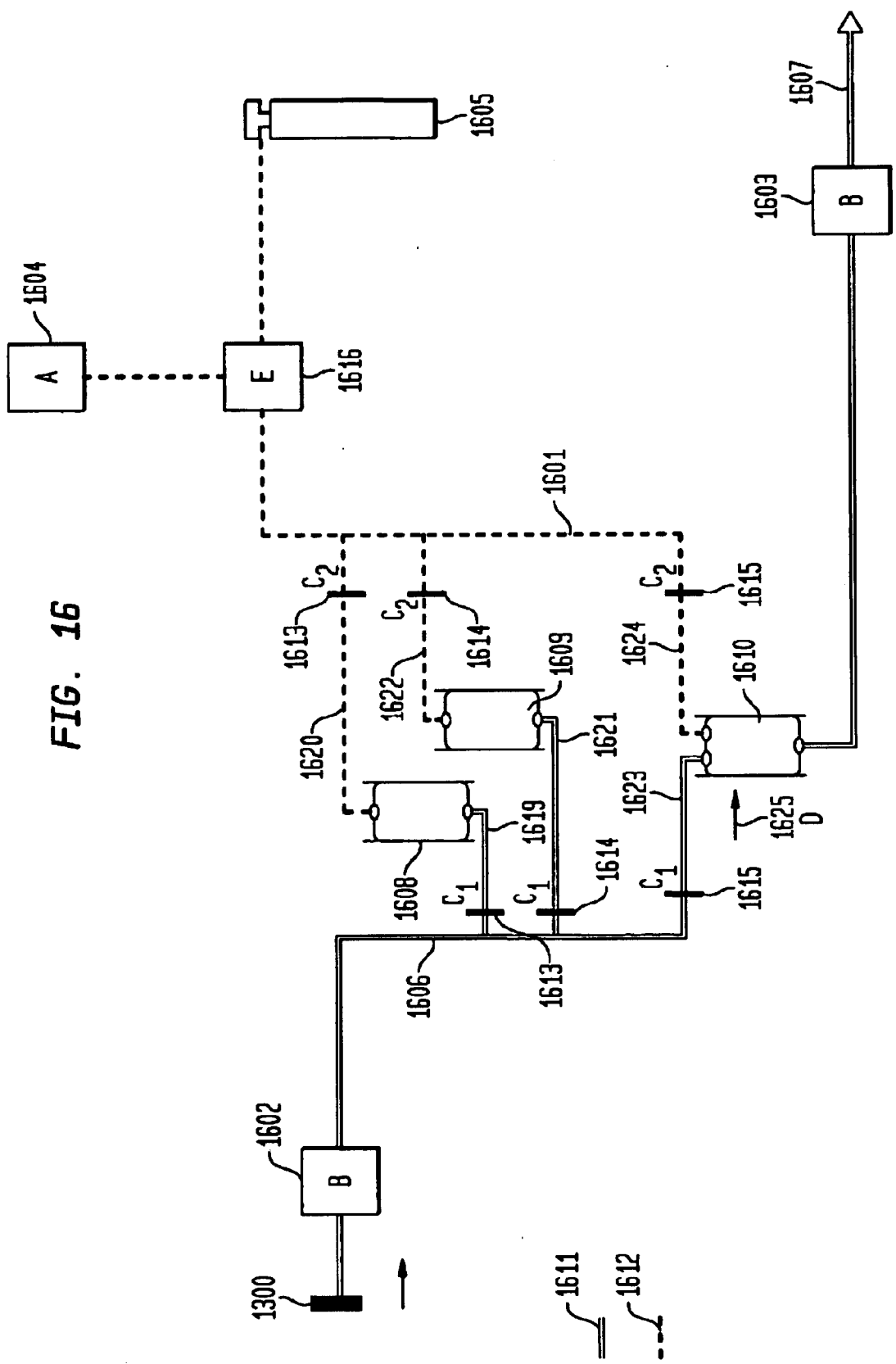
FIG. 16 illustrates the propellant and material lines.

FIG. 16 illustrates in detail the propellant and fluid lines coupled to mini-tanks 1608, 1609, and 1610. For ease of illustration, this figure depicts a single line, single beverage system. In practice, however, it is preferred that the invention be utilized in a multi-beverage system. For ease of reference, linetype 1611 represents a fluid line, and linetype 1612 represents a gas line. Again, trucks connect to the system via coupler 1300. As fluid flows into the system, flow meter 1602 measures the volume transferred. Data from intake flow meter 1602 is sent to the PLC (see item 502 of FIG. 5 and associated text) and is used to calculate the on-hand beverage balance. The fluid flows into each of the mini-tanks 1608, 1609, and 1610 via central liquid column 1606 through fluid couplings 1619, 1621, and 1623, respectively.

Gas tank 1605 stores the preferred propellant gas. The gas can be carbon dioxide or nitrogen, for example. Also included is an exhaust with a spring valve 1604. This device 1604 is used to evacuate gas in the system when fluid is being introduced via coupler 1300. Float valve 1616 prevents the fluid being introduced into the system from entering the exhaust with spring valve 1604, or the gas source 1605. In this embodiment, the beverage is not carbonated or gassed because such a system would require a different exhaust mechanism. Gas flows via central gas column 1601 into tanks 1608, 1609, and 1610 via gas couplings 1620, 1622, and 1624, respectively. The gas is used to displace the beverage stored in the tank, and send it through the fluid lines, through the outtake flow meter 1603 to taps for dispensing 1607. Outtake flow meter 1603 is coupled to the PLC (see item 503 of FIG. 5 and associated text) to measure usage. Alternatively, or in addition, liquid level sensors can be placed in each tank 1608, 1609, and 1610, or in the central liquid column 1606 to provide a direct reading of material level.

Gas sensor 1625 is used to auto-calibrate the liquid on-hand balance and protect against a faulty stock-out condition. When the liquid from mini-tank 1610 (the last and lowest mini-tank for this material) is depleted to the position of the gas sensor 1625, the gas sensor sends a signal to the PLC (see item 503 of FIG. 5, and associated text). This signal is compared to the calculated on-hand balance, and an adjustment is made if necessary. This method also provides an alert in case the calculated on-hand balance is wrong, and the system reports that there is more fluid in the system than there actually is. Tank valving 1613, 1614, and 1615 is used to isolate a tank 1608, 1609, or 1610, respectively, during cleaning, installation, or removal.

Figure 17A:
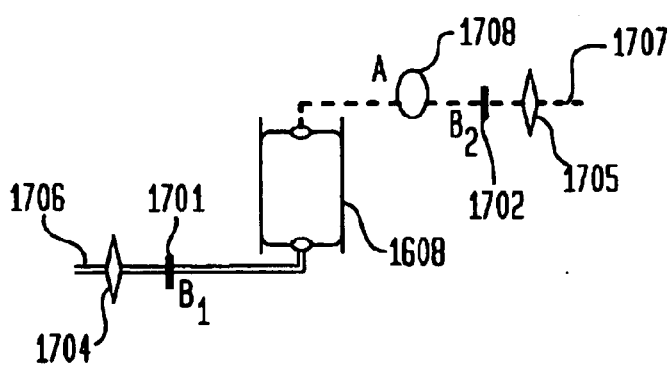
FIG. 17A and FIG. 17B are details of mini-tank valving.
Figure 17B:
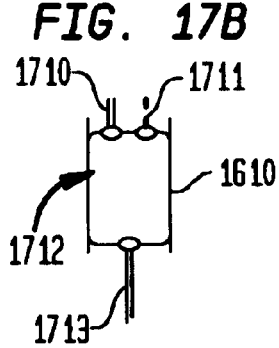

Tank valving as depicted in FIG. 16 is shown in greater detail in FIG. 17A and FIG. 17B. Tank 1608 (which is representative of any tank in the system except for the last tank in the system) and its associated hardware is depicted. Fluid line 1706 is coupled to tank 1608 through fluid valve 1701 and first tank nut 1704. Gas line 1707 is coupled to tank 1608 through gas valve 1702, pressure entry valve 1708, and second tank nut 1705. Tank nuts 1704 and 1705 attach tank 1608 to the fluid line 1706 and gas line 1707, respectively.

Pressure entry valve 1708 is used to evacuate tank 1608 by first closing valve 1702, and injecting gas through valve 1708 until gas reaches valve 1701, at which point valve 1701 is closed and tank 1608 may be removed. This is done in instances wherein the customer decides to remove tank 1608 before its contents have been exhausted in the conventional fashion. To remove tank 1608, preferably in the empty state (though a full tank can be emptied and removed), valves 1701 and 1702 are closed, and tank nuts 1704 and 1705 are loosened. When valves 1701 and 1702 are open, and tank 1608 is connected, the system is in normal operation.

FIG. 17B depicts tank 1610 and its associated hardware (as depicted in FIG. 16). Tank 1610 is an example of the last mini-tank in a line. As shown in FIG. 16, the last tank 1610 should be physically lower than the other mini-tanks in the line. Fluid line 1710 is coupled to tank 1610 to receive fluid from the central liquid column. Gas line 1711 is coupled to tank 1610, and receives gas from the gas source via the central gas column. Liquid exits toward the dispense taps via second liquid line 1713. Gas sensor 1712 (preferably a float valve) is disposed at the top of the inside of tank 1610. When the liquid level begins to lower inside tank 1610, sensor 1712 sends a signal to the PLC to auto-calibrate the volume for this liquid, and to protect against faulty volume readings that would lead to out-of-stock conditions.

Figure 18:
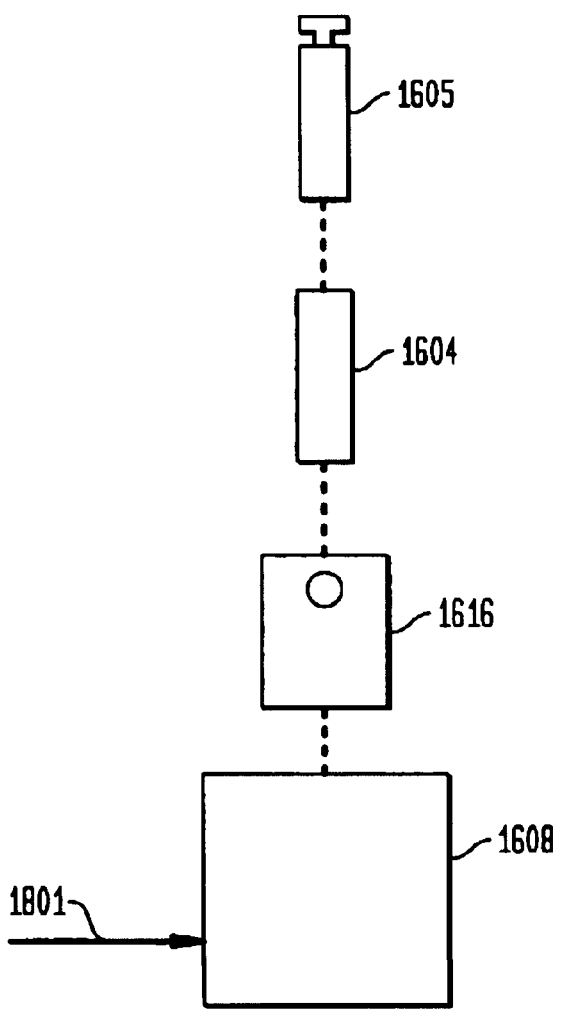
FIG. 18 is a schematic of the exhaust system components.

FIG. 18 is a schematic of the exhaust system components of the present invention. Exhaust with spring valve 1604, float valve 1616, gas tank 1605, and tank 1608 as depicted in FIG. 16 have been isolated and arranged as illustrated to simplify explanation. As liquid enters tank 1608 (as illustrated by arrow 1801), gas from tank 1605 that was already in the system due to normal operation is displaced by the entering fluid at a higher pressure, and escapes via exhaust with spring valve 1604. The spring valve 1604 is set at normal system pressure. When the entering liquid reaches float valve 1616, it closes, thereby preventing the liquid from escaping via exhaust 1604. Gas that is exhausted via exhaust 1604 may be piped to an external or other location for re-usage or disposal.

Figure 19A:
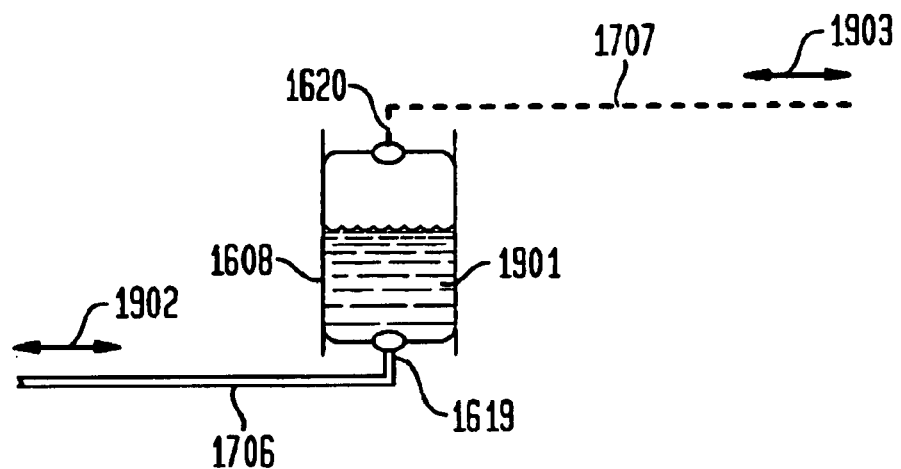
FIG. 19A and FIG. 19B illustrate mini-tank embodiments.

FIG. 19A illustrates the disclosed preferred embodiment of a mini-tank 1608, representative of any mini-tank in the system but the last tank in the system. In tank 1608, fluid 1901 exits or enters the tank (as indicated by arrow 1902) via fluid line 1706 and fluid coupler 1619. As gas enters tank 1608 via gas line 1707 and through gas coupler 1620, the entering gas displaces the fluid 1901, causing it to flow out fluid coupler 1619, fluid line 1706, and eventually, a tap. The gas flow is also bi-directional (as illustrated by arrow 1903), since gas exits as the tank is filled with fluid, and gas enters when fluid is dispensed.

Figure 19B:
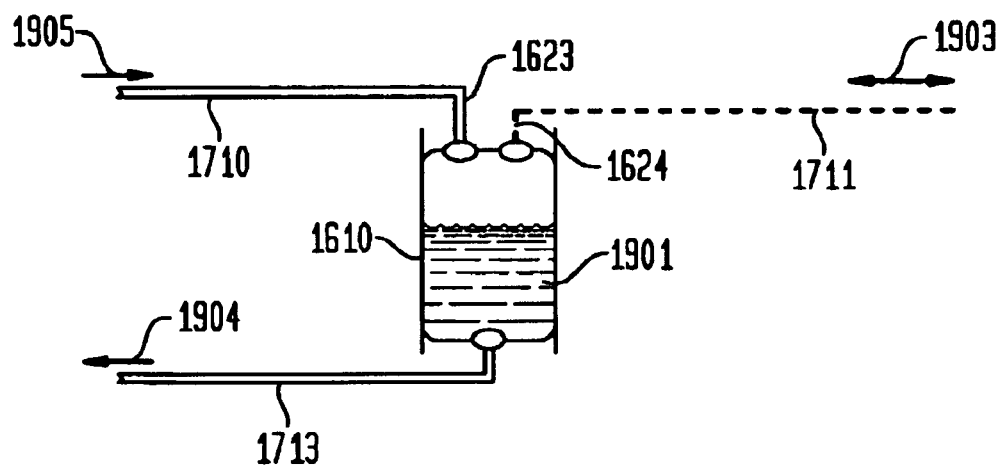

A slightly different mini-tank configuration is used for the last mini-tank of each line depicted in FIG. 19B. Tank 1610, the last tank in the embodiment of FIG. 16, is taken as an example. Tank 1610 is filled via fluid line 1710, through which fluid only flows in the direction indicated by arrow 1905. Gas flow through gas line 1711 is bi-directional, in accordance with arrow 1903. Fluid 1901 exits tank 1610 in direction 1904 through second fluid line 1713. Flow through line 1713 is unidirectional. Using the gas flow through gas line 1711 as a reference, as gas flows toward tank 1610, liquid 1901 exits via line 1713. As gas flows away from tank 1610, liquid is drawn into tank 1901 through line 1710.

As described, fluid normally exits via liquid lines 1706 or 1713. However, during cleaning or purging operations, the liquid and gas lines can be disconnected from the tanks after proper valving (see FIG. 17 and associated text).

Figure 20:
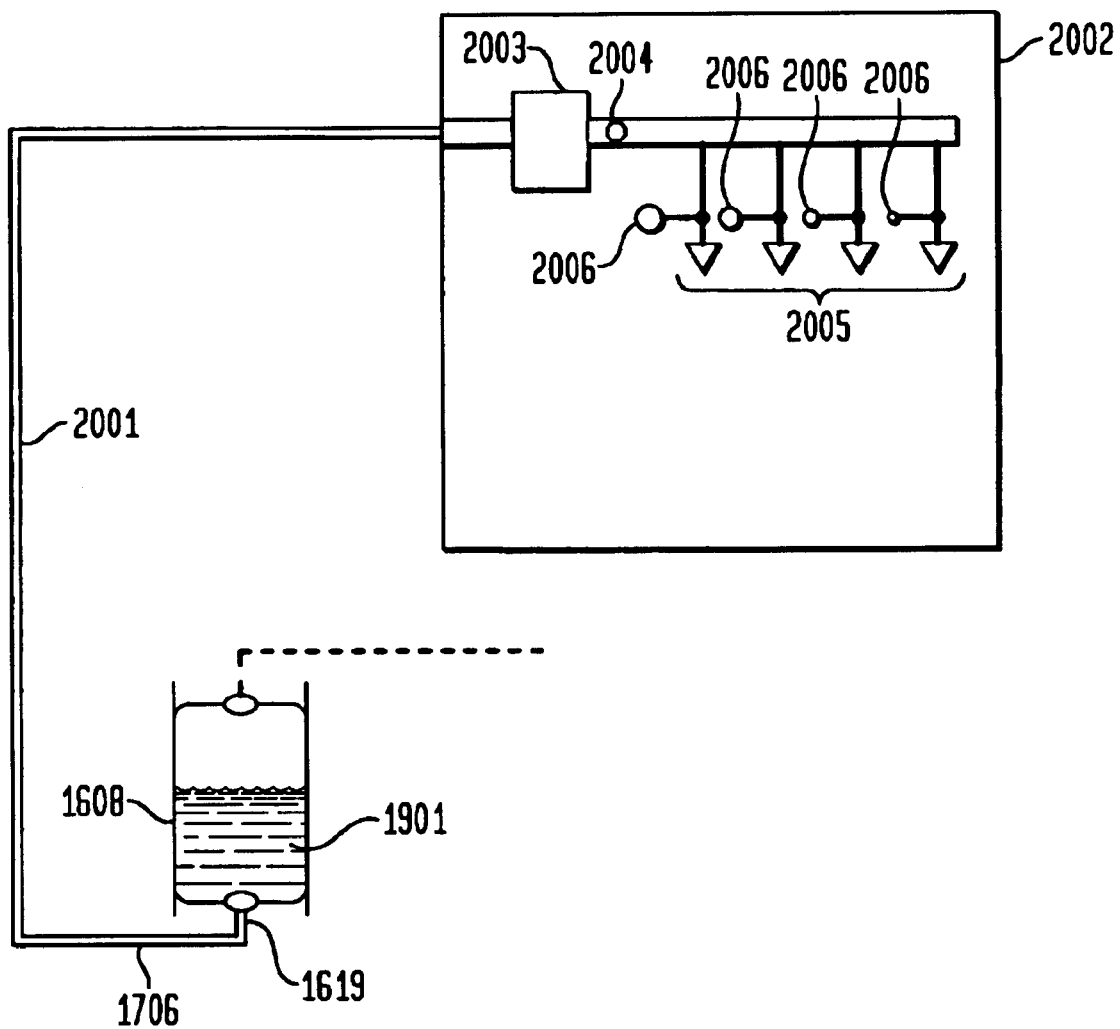
FIG. 20 illustrates the dispensing system.

FIG. 20 illustrates the dispensing system in accordance with the present invention. Tank 1608 is again isolated as shown in FIG. 19. A single tank is shown for clarity, but it is preferred that multiple tanks are used. Here, line 2001 is coupled to fluid coupler 1706. Line 2001 carries fluid 1901 to the dispensing area 2002. In the illustrated embodiment, a cooling unit 2003 is disposed in the dispensing area 2002 to cool the beverage immediately prior to actual dispense. The cooling unit is a single line or python-based system based on the needs of the fluid being handled. A monitor 2004 measures and reports the temperature at the dispense point in order to track beverage temperature at the point of service. Preferably, a second monitor measures and records the ambient air temperature in the area of the mini-tank 1608. The dispense heads 2005 allow dispensing of the fluid, and associated equipment 2006 may be used for purposes such as carbonation, flavoring, coloring, mixing, or measuring.

Figure 21:
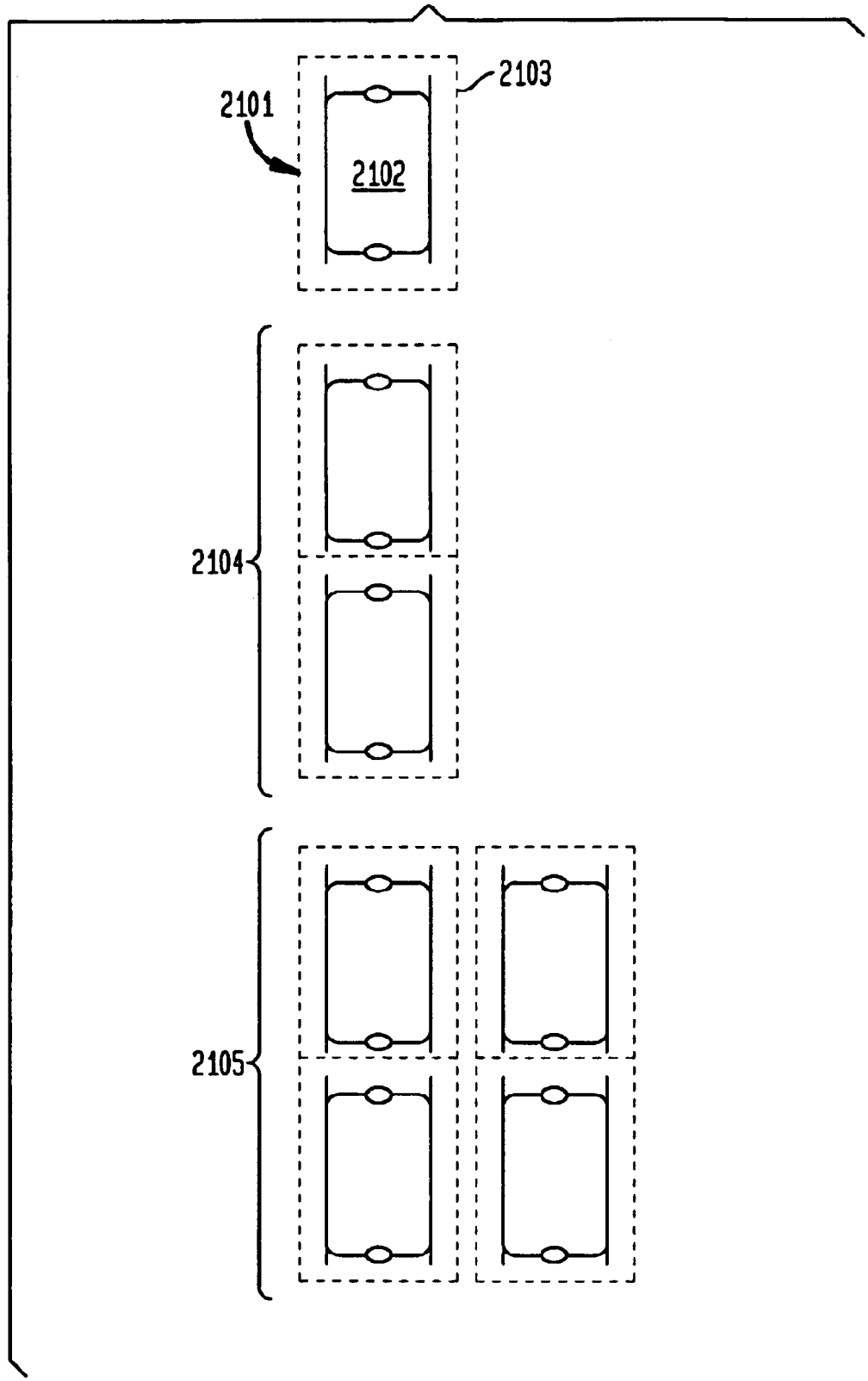
FIG. 21 illustrates a racking system for use with the present invention.

FIG. 21 illustrates a racking system that can be used with the present invention. Pre-built pod 2101 encases a mini-tank 2102 and all accessories 2103 such as piping and connectors. Pods may be arranged in a stacked fashion 2104, or into arrays 2105 for higher capacity systems. Pods are the preferred manner in which to provide mini-tanks because their shape and integrated accessories simplify shipping and installation. Of course, the mini-tanks can be provided without the pods 2101. Using mini-tanks without pods facilitates the arrangement of mini-tanks in various areas of different rooms. Pods 2101, on the other hand, facilitate aggregating all of the mini-tanks into one area.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

We claim:

1. A method for efficiently maintaining an adequate supply of a plurality of different fluids at customer sites by controlling the periodic delivery of needed amounts of such fluids to such sites from one or more bulk suppliers of such fluids, comprising the steps of:
   (a) periodically delivering amounts of such fluids from said one or more bulk suppliers to mini-bulk containers at customer sites for being dispensed to end users from said mini-bulk containers, the delivery employing a vehicle including a separate bulk tank for each of the fluids being delivered to the customer sites during a delivery run of said vehicle, each customer site including a separate mini-bulk container for each of the fluids being delivered to such customer site;
   (b) electronically receiving information transmitted from each such customer site concerning the amount of each of the fluids in the mini-bulk containers at the customer site, said information having been generated by the automatic monitoring of the amounts of each of such fluids in such mini-bulk containers;
   (c) determining the amount of each of such fluids to be delivered to each customer site by said vehicle during a delivery run to replenish the stock of each of such fluids at each such customer site based on said information received from each customer site; and
   (d) loading said tanks in said vehicle with a sufficient amount of each of the fluids to be delivered to customer sites during said delivery run to permit the delivery to each such customer site of the amounts of each of said fluids determined in step (c).

2. The method of claim 1 wherein said vehicle includes a number of tanks greater than the number of different fluids being delivered to customer sites during a delivery run for providing greater delivery capacity for those fluids in greater demand by said customer sites.

3. The method of claim 1 wherein the maximum of amount of each fluid delivered to a customer site during a run is that amount determined in step (c) for such fluid for such customer site.

4. The method of claim 1 wherein said delivering step further includes simultaneously delivering a plurality of different fluids from said vehicle to separate mini-bulk containers at a customer site via separate conduits from said vehicle for each fluid being delivered.

5. The method of claim 4 wherein each of said conduits can mate only with a corresponding one of a plurality of fluid receiving channels at the customer site.

6. The method of claim 4 wherein each of said fluid receiving channels is coupled to a different one of said mini-bulk containers.

7. The method of claim 1 wherein said separate conduits are incorporated into a single multi-conduit hose.

8. The method of claim of 7 wherein said multi-conduit cable is terminated in a coupler shaped for being coupled to a delivery point at the customer site in only one predetermined orientation.

9. The method of claim 1 further including monitoring the amount of each fluid delivered to a customer site.

10. The method of claim 1 wherein said delivering step further includes delivering said fluids from said vehicle to the customer site at a location accessible from the exterior of the customer site.

11. The method of claim 1 wherein said delivering step further includes the step of obtaining customer approval for such delivery.

12. The method of claim 1 wherein the received information concerning amount of each fluid in the mini-bulk containers at a customer site is automatically transmitted from the customer site without customer intervention.

13. The method of claim 1 wherein said step of receiving information concerning the amount of fluid in each of said mini-bulk containers at a customer site includes the receiving of information concerning characteristics of the storage conditions and the fluids at said customer site.

14. The method of claim 1 further including:
   (a) monitoring the amount of each fluid delivered to a customer site: and
   (b) monitoring the amount of each fluid remaining at the customer site as such fluids are dispensed to end users.

15. A method for efficiently storing, dispensing and maintaining at a site an adequate supply of fluids having different usage rates, comprising the steps of:
   (a) providing a different mini-bulk container at the site for each of such fluids, each of said mini-bulk containers having a fluid inlet and a fluid outlet, the fluid outlet being disposed proximate to the bottom of the container;
   (b) dispensing fluids from said mini-bulk containers to end users;
   (c) monitoring the amount of each of such fluids delivered to the site and the amount of each of such fluids remaining at the site;
   (d) automatically transmitting to a provider information concerning the amount of each of such fluids remaining at the site for causing said provider to periodically replenish such fluids; and
   (e) providing a plurality of separate flow channels from a location accessible from the exterior of the site, each for a different predetermined one of said fluids, each of said flow channels being connected to the mini-bulk container for such predetermined fluid.

16. The method of claim 5 wherein the step of providing a plurality of separate flow channels includes providing a multi-channel receptacle on the exterior of the site to which all of said flow channels are connected.

17. The method of claim 15 wherein the step of providing mini-bulk containers includes providing a plurality of such mini-bulk containers for one of said fluids in which one of said mini-bulk containers is positioned below the other mini-bulk containers of said plurality, said other mini-bulk containers of said plurality being connected in parallel with each other and connected in series with said one mini-bulk container for gravity feed of said fluid from said other mini-bulk containers to said one mini-bulk container; said flow line from said replenishing connector being connected to said parallel-connected mini-bulk containers, the dispensing of the fluid stored in said plurality of mini-bulk containers taking place from said one of said plurality of mini-bulk containers.

18. The method of claim 15 wherein said monitoring step includes monitoring the amount of each fluid delivered by said supplier.

19. The method of claim 15 wherein said monitoring step includes monitoring the amount of each fluid dispensed to end users.

20. Apparatus for efficiently storing, dispensing to end users and replenishing a plurality of different fluids at a site comprising:

(a) mini-bulk containers for separately storing each of said different liquids, including a plurality of such containers for storing one of said fluids in which one of said mini-bulk containers is positioned below the other mini-bulk containers of said plurality, said other mini-bulk containers of said plurality being connected in parallel with each other and connected in series with said one mini-bulk container for gravity feed of said fluid from said other mini-bulk containers to said one mini-bulk container;

(b) a dispenser for each of said fluids for selectively dispensing said fluids to end users;

(c) a replenishing connector at a location accessible from the exterior of the site; and (d) a separate flow line for each of said fluids from said connector to the mini-bulk containers, one of said flow lines from said replenishing connector being connected to said parallel-connected mini-bulk containers, the dispenser for the fluid stored in said plurality of mini-bulk containers being connected to said one of said plurality of mini-bulk containers.

\* \* \* \* \*